US007885610B2

(12) United States Patent
Isenmann et al.

(10) Patent No.: US 7,885,610 B2
(45) Date of Patent: Feb. 8, 2011

(54) TRANSCEIVER FOR WIRELESS TRANSMISSION OF FIELD DEVICE SIGNALS

(75) Inventors: Andreas Isenmann, Haslach i.K. (DE); Thomas Deck, Wolfach (DE)

(73) Assignee: Vega Grieshaber KG, Wolfach (DE)

( * ) Notice: Subject to any disclaimer, the term of this patent is extended or adjusted under 35 U.S.C. 154(b) by 821 days.

(21) Appl. No.: 11/734,327

(22) Filed: Apr. 12, 2007

(65) Prior Publication Data
US 2007/0243830 A1 Oct. 18, 2007

Related U.S. Application Data

(60) Provisional application No. 60/791,720, filed on Apr. 12, 2006.

(30) Foreign Application Priority Data
Apr. 12, 2006 (DE) .................. 10 2006 017 243

(51) Int. Cl.
*H04B 1/38* (2006.01)
(52) U.S. Cl. .................. 455/73; 455/67.11; 455/69; 455/70; 340/584; 340/572.1; 340/572.4; 702/127; 702/188; 702/140
(58) Field of Classification Search .................. 455/69, 455/70, 67.11, 73; 340/584, 572.1, 572.4
See application file for complete search history.

(56) References Cited

U.S. PATENT DOCUMENTS 4,322,775 A * 3/1982 Delatorre .................. 361/283.4
5,566,356 A * 10/1996 Taketsugu .................. 455/436
5,586,066 A * 12/1996 White et al. ................. 702/181
5,974,320 A * 10/1999 Ward et al. .................. 455/437
6,026,352 A * 2/2000 Burns et al. ................. 702/182
6,091,951 A * 7/2000 Sturniolo et al. ......... 455/432.2
6,178,997 B1 * 1/2001 Adams et al. ............. 137/487.5
6,294,732 B1 9/2001 Hoffman et al.
6,725,179 B1 * 4/2004 Nagase ...................... 702/188
7,262,693 B2 * 8/2007 Karschnia et al. ........... 340/508
7,453,834 B2 * 11/2008 Tapperson et al. .......... 370/310
7,460,865 B2 * 12/2008 Nixon et al. ................ 455/428
2003/0073884 A1 4/2003 Goldberg
2005/0289276 A1 12/2005 Karschnia et al.
2006/0192671 A1 8/2006 Isenmann et al.

FOREIGN PATENT DOCUMENTS

| DE | 198 10 350 | 9/1999 |
|---|---|---|
| DE | 20 2004 000 928 | 9/2004 |
| DE | 10 2005 008 488 | 9/2006 |
| EP | 0 994 399 | 4/2000 |
| EP | 1 211 582 | 6/2002 |
| EP | 1 293 853 | 3/2003 |
| WO | 03/023536 | 3/2003 |

* cited by examiner

*Primary Examiner*—Edward Urban
*Assistant Examiner*—Ganiyu Hanidu
(74) *Attorney, Agent, or Firm*—Fay Kaplun & Marcin, LLP

(57) ABSTRACT

A transceiver for wirelessly transmitting process variables with a radio interface and a field device interface is provided. The transceiver has two operating states. The transceiver is designed to receive a field device signal at the field device interface and relay the field device signal via the radio interface in the first operating state. In the second operating state, the transceiver receives a field device signal via the radio interface, and makes the field device signal available at the field device interface.

25 Claims, 10 Drawing Sheets

TRANSCEIVER FOR WIRELESS TRANSMISSION OF FIELD DEVICE SIGNALS

REFERENCE TO RELATED APPLICATIONS

This application claims the benefit of the filing date of German Patent Application Serial No. 10 2006 017 243.4 filed Apr. 12, 2006 and U.S. Provisional Patent Application Ser. No. 60/791,720 filed Apr. 12, 2006, the disclosure of which applications is hereby incorporated herein by reference.

FIELD OF THE INVENTION

This invention relates to the field of measurement technique. In particular, this invention relates to a transceiver for the wireless transmission of field device signals, a wireless measured value transmission device, and a method for the wireless transmission of field device signals.

TECHNOLOGICAL BACKGROUND OF THE INVENTION

Field device signals are signals provided by a field device, a sensor or a measuring device. Results of measurements, i. e., measured values, are packed or coded in a field device signal. Increasing use is today being made of digitally communicating devices in the area associated with instrumentation technology and process control systems, where sensors or actuators are connected to a controller or evaluator. These devices use field buses like the HART bus, PROFIBUS or Fieldbus Foundation to communicate with each other.

The devices involved are here sometimes difficult to wire, e.g., when obstacles such as river courses must be surmounted. In addition, existing wiring is difficult to modify once installed. In like manner, having to expand a measuring device can pose problems, since permanently installed bus systems most often predispose the installation sites of field devices. This holds true in particular when cabling with conduits. Wiring the evaluators and field devices can become a complicated and expensive proposition given complex geographic structures or long distances between field devices, measuring devices, sensors or actuators. In addition, wiring does not offer any flexibility with respect to modifications.

SUMMARY OF THE INVENTION

A transceiver for the wireless transmission of field device signals, a wireless measured value transmitter and a method for the wireless transmission of field device signals are provided.

One embodiment of this invention provides a transceiver for the wireless transmission of a field device signal. The transceiver has a radio interface for wireless communication and a field device interface for connection to a field device or connection to an evaluator. The transceiver is here designed in such a way as to convert a field device signal, i.e., a measured value or control command, between the radio interface and field device interface, wherein the transceiver and particularly the field device interface is designed to provide a field device-specific function at the field device interface in a first operating state. The transceiver and particularly the field device interface are further designed to provide an evaluator-specific function at the field device interface in a second operating state. The operating state of the transceiver can here be stipulated.

If the transceiver or transceiver system executes a field device-specific function, the transceiver may be coupled with the field device via the field device interface. The transceiver may here execute functions such as interrogating the field device or prompting the field device to execute a measurement.

During the execution of an evaluator-specific function, the transceiver system may be connected with an evaluator, or the transceiver system may itself provide a measured value to a field device interface.

Another exemplary embodiment of this invention provides a wireless measured value transmitter with a first transceiver and a second transceiver. In this wireless measured value transmitter, the first transceiver is in a first operating state, and the second transceiver is in a second operating state. The wireless measured value transmitter is here set up to provide a field signal received at the field device interface of the first transceiver at the field device interface of the second transceiver.

Yet another exemplary embodiment of this invention provides a method for the wireless transmission of field device signals via a transceiver. In the method, the transceiver initially takes a first operating state, or a second operating state will be taken, wherein a field device-specific function is provided in the first operating state at a field device interface, and wherein an evaluator-specific function is provided in the second operating state at a field device-specific interface. The field device signal is converted between a radio interface and the field device interface.

Distinguishing between a first operating state and a second operating state may allow a transceiver to take varying roles in a measured value transmitter without having to use different devices. This means that the wireless transmission of measured values may be realized based on the same hardware platform with only one type of device. The operating state taken by the transceiver may be stipulated. However, the desired operating state may also be detected based on a field device connected to the transceiver, or a connected evaluator. To this end, the transceiver may exhibit a detection device with the ability to detect the type of connected device. Detection may also take place by exchanging a corresponding signal with a code.

As a result, a transceiver may be used in a flexible manner. A direction of flow may most often be indicated for measured values during measured value transmission. The flow of a measured value or field device signal can take place from the field device toward an evaluator. An evaluator may here be a device set up to control a field device and further process or output received measured values.

The evaluator may control the field device during a measurement. Despite the measured value-related signal flow from the field device to the evaluator, bi-directional data exchange may still take place between the evaluator and field device, e.g., to prompt the field device to perform a measurement and receive a measured value. This bi-directional data exchange may also be used for communication via commands and command responses.

Given wireless communication between the field device and evaluator, it may be necessary to convert a field device interface and particularly field device signals into radio signals for transmission via a radio interface. Since measured values may be transmitted from a field device toward an evaluator relative to the measured value transmission direction, wireless transmission may require distinguishing between a field device transceiver and an evaluator transceiver.

Relative to the measured value exchange, the field device transceiver may designate the wireless transmitter, and the evaluator transceiver can designate the wireless receiver. The field device transceiver may here be connected with the field device, and the transmitter can provide field device-specific functions for controlling the field device. Field device-specific functions are here regarded as functions that control the field device. For example, these are functions that instruct a field device to generate a measured value, but also functions that receive (record) the measured value acquired by the field device.

Other evaluator-specific functions can be executed at the receiver, i.e., in the evaluator transceiver. Evaluator-specific functions here include functions used in preparing a measured value.

In other words, this means that a wireless transmitter is configured to control sensors and receive measured values, and to adjust these measured values or field device signals to transmission via the air interface. By contrast, the wireless receiver may be configured to receive a radio signal and unpack a field device signal packed in the radio signal, in turn making the latter available to an evaluator.

A field device may also be an actuator that receives a signal from the evaluator, wherein the signal flow for an actuator takes place in a direction opposite the direction of flow during measured value recording. As a consequence, the signal can flow from one evaluator to the field device or actuator when controlling an actuator.

However, a bi-directional communication relative to the exchange of control commands may take place between the field device transceiver and evaluator transceiver when recording (receiving) measured values or controlling an actuator.

Radio protocols like WLAN (wireless LAN), Bluetooth or Zigbee may be used for radio transmission. The transceiver may here be understood as a gateway for converting the field device interface into the radio interface. Whether to use the transceiver on the evaluator side or field device side can be determined via the selection of operating state. The same hardware platform can hence be used to provide a varying functionality when connected to the field device or to the evaluator. As an alternative, the transceiver can also be used as a wireless display. The wireless display can be a wireless receiver with a display/control unit.

Another exemplary embodiment of this invention discloses a transceiver, wherein the field device signal of the field device interface of the transceiver is a field bus signal. The field device signal may here be from the group of field bus signals comprising a HART® signal, a Profibus signal, a Fieldbus Foundation signal, a 4 . . . 20 mA signal, an I$^2$C signal and a switching signal.

I$^2$C, I2C or IIC (for integrated circuit) is a serial bus for computer systems. It can be used to connect devices with a low transmission speed to an embedded system or main board.

The HART® protocol (highway addressable remote transmitter) may be designated in particular as an open master-slave protocol for bus-addressable field devices. It can implement a method for transmitting data via frequency shift keying (FSK) superposed on the 4 to 20 mA process signal so as to enable remote configuration and diagnostic checks. A HART® interface of the HART® protocol may be designed both as a two-wire bus with integrated power supply (active) or a four-wire bus with separate power supply (passive). A HART® signal corresponding to the HART® protocol involves a digital signal for transmitting measured values. The digital HART® signal is modulated up to a 4 . . . 20 mA signal. As a result, the digital signal can be transmitted in parallel to the analog 4 . . . 20 mA signal. If such a parallel transmission of analog and digital signals takes place, only one field device can be connected to a HART® bus.

On the other hand, up to 15 digital field devices may be connected to a HART® bus in a so-called multi-drop mode. The analog stream is here essentially set to 4 mA. The field devices exchange a digitally coded signal in the multi-drop mode. The digital signal is a frequency-modulated signal, wherein the frequency-modulated signal may have one of the two frequencies 1200 Hz and 2200 Hz.

Both I2C and HART® are suitable as a protocol for communicating with the field device, e.g., with a fill level meter or pressure gauge.

Field devices in this application include any type of measuring device, e.g., fill level meters, pressure gauges, limit acquisition measuring devices or temperature measuring devices, just to name a few examples. Different physical effects may here be used for acquisition purposes. Measured value acquisition may take place using radar beams, ultrasound, vibration, guided microwaves (TDR, time domain reflection) or capacitive effects.

The variable provision of different field device signal interfaces may allow the potential interaction with different evaluators or different field devices or display units. An evaluator or field device can here be connected to the field device interface of the transceiver. The field bus signals provided at the field device interfaces can be converted into radio signals in the transceiver, and thereby be transmitted via the airways, i.e., wirelessly.

Wireless transmission via an evaluator transceiver and field device transceiver may make it possible to break a hardwired connection via a field bus, replacing hardwired transmission by wireless transmission.

In yet another exemplary embodiment of this invention, the field device interface is designed as an internal interface.

For example, a function for determining the display values in the transceiver may be executed in a display unit. The determined value to be displayed may here be provided via the internal field device interface in the transceiver to a display/control unit integrated in the transceiver. This also may make it possible to display a measured value received through radio transmission at the transceiver via an I$^2$C interface. In another adjustable operating state, the transceiver may be used as a display.

Yet another exemplary embodiment of this invention provides a transceiver in which the radio interface is designed as an antenna. The antenna exhibits configurable antenna characteristics.

Configurable antenna characteristics may make it possible to adjust the transmission behavior of a radio interface. For example, antenna characteristics may be configured by means of an antenna array, wherein the antenna characteristics are controlled electronically. As a result, for example, beams may be radiated in a specific direction. This may make it possible to increase the range of a radio signal. Configurable antenna characteristics may also allow the creation of so-called radio cells, meaning that areas where various radio frequencies are used can be separated from each other. As a consequence, small cells can be provided, making more bandwidth available relative to the overall surface area.

Another exemplary embodiment of this invention further provides a transceiver in which the radio interface exhibits a power limiter.

The radio interface may be realized by means of a radio module. Legal regulations may necessitate a reduction in the transmitting power of a radio module. In addition, it may be necessary to reduce the transmitting power of a radio interface to avoid overreaching and interference between different radio modules. Power limitation may here be preset. A configurable power limitation may make it possible to set the transmitting power of a transceiver without using different hardware.

Yet another exemplary embodiment of this invention provides a transceiver, wherein the radio interface is designed to operate at a configurable frequency of 900 MHz or 2.4 GHz. The configurable frequency may make it possible to switch between different frequencies. As a result, the transceiver may also be flexibly adapted to conform to legal provisions. Radio transmission technologies such as WLAN or Bluetooth, for example, use the so-called ISM (industrial, scientific and medical) band for data transmission. The ISM band may be used without a license for industrial, scientific or medical applications. The 2.4 GHz band is here approved worldwide for industrial, scientific or medical applications.

This ISM band may also be used by wireless phones or babyphones, for example. While there might be requirements governing the transmitting power and disruption of adjacent frequencies, transmission within the free ISM band may become disrupted for the many devices operating in this band. Under certain conditions, these disruptions may require that transmitted information be repeated. As a result, there may be delays during transmission.

In another exemplary embodiment of this invention, the transceiver may be parameterized by means of a detachable control or display unit.

The display/control unit can provide a man-machine interface for the transceiver. A user may parameterize the transceiver or display received values via the display/control unit. For example, the display/control unit may make it possible even to switch between operating states of the transceiver.

Yet another exemplary embodiment of this invention provides a transceiver, wherein the transceiver may be switched between a master function and slave function.

Acting via the field device interface, a master function may instruct field device connected to the field device interface to prepare measured values. As a consequence, a wireless transmitter set up as the master or a field device transceiver may instruct a connected sensor or connected field device to initiate a measurement and prepare a measured value.

By contrast, if a transceiver takes or assumes a slave function, the transceiver may control an evaluator connected to the field device interface via the field device interface. As a consequence, a transceiver may receive the instruction to interrogate a field device. By assuming a slave function, a transceiver may simulate a transparent field bus relative to an evaluator. In other words, this means that the transceiver as the receiver or evaluator transceiver may make the evaluator think that the transceiver is a field device.

An request by the evaluator to an evaluator transceiver may trigger a function in the transceiver that causes the transceiver to interrogate a removed field device. As a result of this interrogation, the transceiver relays a measured value back to the evaluator.

Since the radio transmission between the transceiver and field device may give rise to delays, a proprietary field device protocol adjusted to this delay can be used between the evaluator and transceiver.

Another exemplary embodiment of this invention provides a transceiver, wherein the transceiver exhibits an offset or deplaced interface device, which exhibits a plurality of field device interfaces. The offset interface device can be coupled to the transceiver via one of the plurality of field device interfaces of the offset interface device. At least one of the plurality of field device interfaces of the offset interface device is designed to provide a field device signal for a remote field device.

Transceivers connected to field devices may provide the field device signals via the radio interface. In this case, for example, several field devices can be connected with a transceiver having a correspondingly high number of field device interfaces, or several transceivers can communicate in the field with an evaluator transceiver. The evaluator transceiver can relay the signals from the field devices to the offset interface device via just a single interface. The offset interface device may provide the signals for the several field devices at one of the respective plurality of field device interfaces. This may make it possible to provide the signals of several field devices at a single transceiver, so that few transceivers must be used to interrogate several field devices.

Yet another exemplary embodiment of this invention offers a transceiver with modular casing, wherein the modular casing exhibits a top casing module and receptacle casing module. The receptacle casing module is designed to provide a field device interface, and the receptacle casing module may be coupled with the top casing module.

Because the top casing module and receptacle casing module can be coupled, a function that is the same for several transceivers can be incorporated in the top casing module, while various field device interfaces can be provided for different applications via the couplable receptacle casing module. This may make it easy to fabricate the transceivers. In addition, a transceiver can be expanded, and retrofitting with various field device interfaces is enabled.

Therefore, the field device interfaces are interchangeable while retaining a basic functionality, so that several field device interfaces can be provided via a single receptacle casing module, if required. On the other hand, however, it may also be desirable to provide only a single field device interface for a single field device.

The basic function, specifically interrogating one or more field device interfaces and converting in to a radio protocol, can here be identical for all transceivers, regardless of the number of interfaces to be operated.

However, a removable and exchangeable receptacle casing module can also be used to attach a floor plate to a top casing module, wherein the floor plate provides no interface, but does serve to secure the transceiver. It may be desirable to use a floor plate as the receptacle casing module when utilizing the transceiver as the display unit.

Yet another exemplary embodiment of this invention discloses a transceiver, wherein the interface provided by the receptacle casing module is designed as a terminal for a two-conductor (two-wire) field device. A terminal for a two-conductor field device may exhibit two clamps for hooking up a two-wire connection. A two-conductor field device may be supplied with power via this two-conductor terminal.

The configuration as a two-conductor terminal may represent an exemplary physical setup for the field device interface. While signals transmitted via this interface can physically differ from otherwise configured physical field device interfaces, but the signals transmitted via the field device interfaces can match each other in terms of content. As a result, an adjustment to the physical characteristics of a field device interface can be made in the receptacle casing module, while the basic function accommodated in the top casing module, for example, can be identical for all different physical permutations of the field device interfaces. Relative to a layer model developed for the display of protocols, functions of the physical adjustment layer may be incorporated into the receptacle casing module.

In yet another exemplary embodiment of this invention, the interface provided by the receptacle casing module may be designed as a terminal for a four-conductor field device. A four-conductor terminal may exhibit four terminal clamps, enabling the separate transmission of field device signals and power supply signals. Two terminal clamps may be provided for power supply, and two additional terminal clamps of the four terminal clamps may be provided for communication, i.e., data transfer.

However, a transceiver may also exhibit only two terminal clamps for connecting a four-conductor device to the transceiver, since the four-conductor device can be supplied with power via an external current or voltage supply source. In comparison to the two terminal clamps also exhibited by a two-conductor system, the two terminal clamps of the four-conductor device can differ in that no power is supplied via the terminal clamps of the four-conductor device.

Yet another exemplary embodiment of this invention discloses a transceiver in which the receptacle casing module provides an interface for hooking up a digital switch.

The interface for a switch can encompass an optocoupler, making it possible to establish a galvanic separation of a switch input. The switch signal can be converted into a radio signal in the transceiver, in particular in a circuit housed in the receptacle casing module, and then relayed via the air interface. The state of a connected switch can be interrogated at the evaluator, in particular at the offset interface device, by receiving and evaluating the radio signal.

Another exemplary embodiment of this invention discloses a transceiver with receptacle casing module, wherein the receptacle casing module is designed to provide an interface for hooking up a 4 . . . 20 mA device. The 4 . . . 20 mA device can be a measuring device that provides an analog measured value. The 4 . . . 20 mA device terminal may also be used to wirelessly transmit an analog measured value or percentage value.

Yet another exemplary embodiment of this invention provides a transceiver with a receptacle casing module, wherein the receptacle casing module is designed to determine and set the operating state of the transceiver.

For example, the receptacle casing module may incorporate a code for designating the receptacle casing module that can be interrogated by the transceiver when coupled with the casing top module. The transceiver may automatically detect the type of interface provided by the receptacle casing module. As a result, the transceiver can adjust to the interface provided by the receptacle casing module, and the transceiver may set its operating state accordingly.

As a consequence, the receptacle casing module can also be used to determine whether the transceiver is currently being used as a wireless transmitter, i.e., a field device transceiver, or as a wireless receiver, i.e., as an evaluator transceiver. In addition to automatic switchover, the operating state may also be changed manually by correspondingly configuring the transceiver.

Yet another exemplary embodiment of this invention discloses a transceiver, wherein the receptacle casing module is designed to determine the type of transceiver as a function of the provided interface.

The type of transceiver may be set between a wireless receiver, wireless transmitter or a display unit. The transceiver may also detect the number of connected field devices, in addition to the type of connected field devices. It may also be possible to determine whether a HART® field device, a 4 . . . 20 mA field device or a switch is hooked up to the receiver. As a result, the transceiver may adjust to the respectively provided interfaces and the function or type to be assumed by the transceiver.

Another exemplary embodiment of this invention specifies a transceiver whose modular top casing module exhibits an antenna. Radio transmission may take place via the antenna, which can be arranged externally or internally on the top casing module.

In another exemplary embodiment of this invention, the antenna may be screwed to the top casing module. This may make it possible to easily install or remove the antenna.

In yet another exemplary embodiment of this invention, the antenna may be screwed to the top casing module using an M20×1.5 or ½" NPT (national pipe thread) threaded joint.

Yet another exemplary embodiment of this invention specifies a transceiver in which the field device interface is designed for connecting a conduit.

The conduit is mostly a metallic sheathing over a wire connection. A conduit may make it possible to protect a bus against exposure to mechanical influences.

In yet another exemplary embodiment of this invention, the transceiver exhibits a power supply system, wherein the power supply system is designed in such a way as to supply power to a field device connected via the field device interface.

A power supply system in the transceiver that may be used to supply power to a field device, e.g., a two-conductor field device, enables the autarkic use of a transceiver with a field device. As a consequence, the field device may do without a separate power supply system. For example, power supply may take place via a photocell in the transceiver or another regenerative power source.

On the other hand, the transceiver may incorporate a power supply unit for conversion and power supply for the field device or sensor. The energy or power generated by this power supply system may be transmitted via the two-conductor terminal together with useful signals. In a four-conductor system, this power is transmitted over separate lines apart from the useful signals.

Numerous configurations of the invention were described previously in relation to the transceiver. These embodiments apply accordingly to the wireless measured value transmission arrangement and the method for wirelessly transmitting field signals.

Additional exemplary embodiments of this invention will be described below with respect to the wireless measured value transmission arrangement and the method for wirelessly transmitting field device signals. These configurations also apply to the transceiver.

Another exemplary embodiment of this invention discloses a wireless measured value transmission arrangement that further exhibits a third transceiver equipped as described above, wherein the measured value arrangement exhibits an offset or displaced interface device with a plurality of field device interfaces. The third transceiver is here in the first operating state, and the offset interface device can be coupled to the second transceiver via a first field device interface from among the plurality of field device interfaces.

A second field device interface of the offset interface device is here designed to provide a measured value received or recorded via the field device interface of the first transceiver coupled with the second transceiver. A third field device interface of the offset interface device is here designed to provide a measured value recorded at the field device interface of the third transceiver.

Therefore, the measured values received or recorded at locally separated measuring devices can be provided at a single offset interface device. Even though the measuring devices are hooked up to the first transceiver and third transceiver, the measuring devices can be provided on an offset interface device. However, the measured values may again be provided at separate field device interfaces of the offset interface device.

The offset interface device may also communicate with the second transceiver via a proprietary field device interface of the offset interface device. As a consequence, the offset interface device may provide a standard field device protocol at the field device interfaces, while the offset interface device may utilize a proprietary field device interface protocol for communicating with the transceiver.

BRIEF DESCRIPTION OF DRAWINGS

Exemplary embodiments of this invention will be described below with reference to the figures.

DETAILED DESCRIPTION

The representations in the figures are diagrammatic and not to scale. The same reference numbers are used for identical or corresponding elements in the following description of FIG. 1 to FIG. 21.

Figure 1:
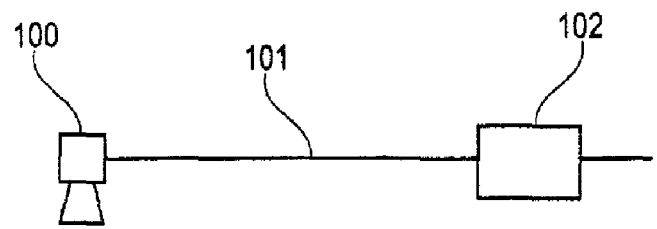
FIG. 1 shows a wired measured value transmission arrangement according to an exemplary embodiment of this invention.

FIG. 1 shows a hardwired measured value transmission arrangement according to an exemplary embodiment of this invention. The field device 100, measuring device 100, sensor 100 or actuator 100 is here connected with the evaluator 102 or controller 102 via the bus 101, in particular via the field bus 101. The measured values generated by the sensor 100 are relayed over the wire to the evaluator 102. A line can be drawn between analog and digital transmission during transmission between the sensor 100 and evaluator 102 via the bus 101. For example, analog transmission can take place using a 4 . . . 20 mA signal. Digital transmission or digital communication can take place by means of a field bus protocol, e.g., HART® Profibus, Fieldbus Foundation.

Figure 2:
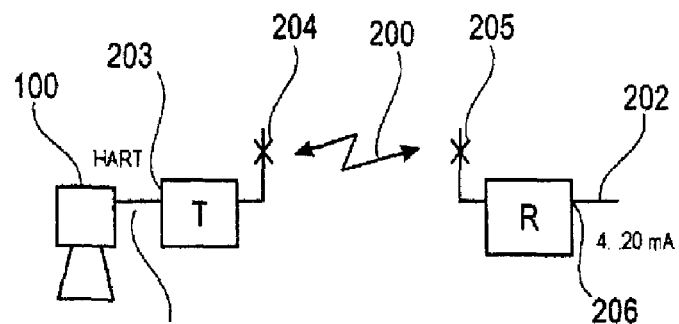
FIG. 2 shows a wireless measured value transmission arrangement according to an exemplary embodiment of this invention.

As depicted on FIG. 2, a transceiver according to the invention may make it possible to disconnect the hardwired bus 101 and replace it with a wireless connection 200. Two transceivers T and R are used to this end on FIG. 2. While the two transceivers T and R are here based on the same hardware platform, the latter is used in varying configurations or operating states.

The field device transceiver, i. e., the transceiver connected with the field device 100, is used as a wireless transmitter in the configuration. A field transceiver will be labeled T in the following.

At the evaluator end, the transceiver is used in the configuration or operating state of a wireless receiver. An evaluator transceiver will be labeled R in the following.

FIG. 2 does not show an evaluator, since FIG. 2 represents the simplest case of disconnecting an analog field device bus. To this end, the wireless transmitter T communicates with the sensor 100 via the connection 201 using the HART® protocol. An analog current value can be transmitted parallel to digital information using the HART® protocol based on the HART® standard via the connection 201, since a single field device is connected to the HART® bus. However, the case depicted on FIG. 2 initially assumes that an analog 4 . . . 20 mA current value is replaced by the wireless transmitter T via the connection 201.

The analog measured values received by the transmitter T via the analog connection 201 are converted into a radio protocol, and relayed to the wireless receiver R as radio signals via the radio interface 200. The wireless receiver R converts the received radio signals back into analog measured values, and provides them to an evaluator or memory-programmable controller (SPS) as a 4 . . . 20 mA signal via the connection 202 for processing purposes.

Relative to measured value transport, the signal flow on FIG. 2 proceeds from the sensor 100 that records the measured value via the wireless transmitter T to the wireless receiver R at the output 202 or at the field device interface 202. Instead of a sensor, the field device 100 may also be an actuator, wherein the signal then flows in the reverse direction, i. e., from the connection 202 via the wireless receiver R, the wireless radio connection 200, the wireless transmitter T and the connection 201 to the actuator. This may also make it possible to control actuator operations.

Despite the direction from a sensor 100 to the connection 202 as established by the measured value flow, bi-directional communication can take place between the wireless transmitter and wireless receiver K for exchanging control systems. The measured value transmission arrangement shown on FIG. 2 may enable the wireless transmission of an analog 4 . . . 20 mA signal. In this application, the wireless transmitter T and wireless receiver R can be regarded as a gateway to wireless communication. The wireless transmitter T converts a field device interface 203 into the radio interface 204, and the wireless receiver R converts the radio interface 205 into the field device interface 206, to which the connection 202 is hooked up.

Figure 3:
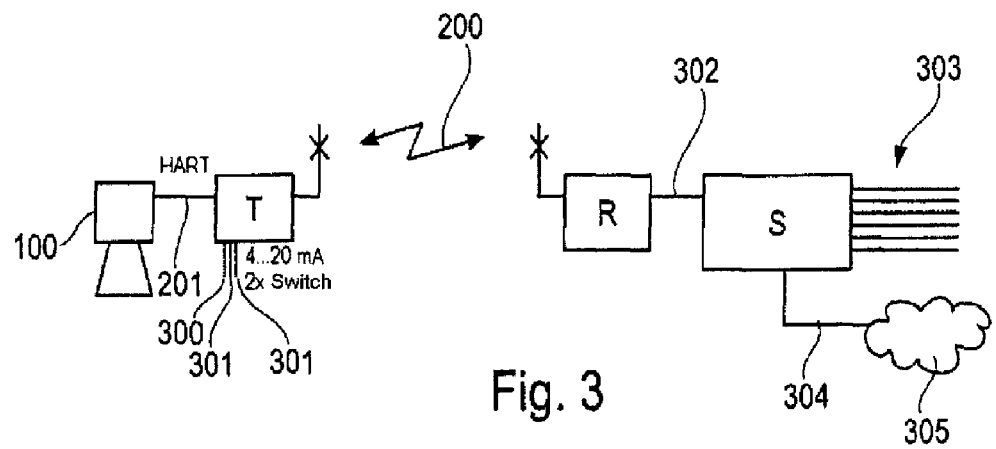
FIG. 3 shows a wireless measured value transmission arrangement with an evaluator according to an exemplary embodiment of this invention.

FIG. 3 shows a wireless measured value transmission arrangement with an evaluator according to an exemplary embodiment of this invention. The arrangement shown on FIG. 3 can also be used to disconnect a field bus 101 and replace it with wireless communication 200. The sensor 100 is connected with the wireless transmitter T via the HART® connection 201. Digital communication will now be assumed for the HART® connection 201 depicted on FIG. 3.

In addition to the HART® interface, the transmitter T shown on FIG. 3 also exhibits a purely analog field device interface 300 in the form of a 4 . . . 20 mA interface, along with two digital interfaces 301 for switch signals. These additional field device interfaces can be provided by changing out a terminal module or receptacle casing module of the wireless transmitter T. Standard HART® sensors 100 can be hooked up to the HART® interface 201. The HART® interface digitally communicates with a connected field device. 4 . . . 20 mA devices can be connected to the analog terminal 300 or analog field device interface 300. The digital inputs 301 are provided for the connection of digital switches, such as limit switches or alarm switches.

The signals received via the interfaces or connections 201, 300 and 301, e.g., measured values, are converted by the transmitter T into a radio protocol, and wirelessly relayed to the wireless receiver R via the radio connection 200. The receiver relays the signals to the evaluator using a proprietary protocol. As a result, the sensor 100 can be operated as though it were directly connected with the evaluating system or evaluator. The evaluating system is here an arrangement that is able to interrogate measured values from a field device 100, and in turn display the received measured values. Communication between the sensor 100 and evaluating system here takes place via "nested communication", i.e., the HART® protocol telegrams are packed into the radio protocol.

The data collector S or evaluator or controller S is connected to the receiver R via the connection 302. The connection between the wireless receiver R and data collector S can be established using a standard HART® protocol 302. However, it may also be desirable to adjust the HART® protocol for communications between S and R, thereby establishing a proprietary communications protocol 302 between the wireless receiver R and the data collector S. This proprietary communications protocol can be based on the HART® protocol, and allow for peculiarities in wireless transmission 200 by way of corresponding adjustments, e.g., relative to time or timing behavior.

The data collector S is an offset interface device S. The offset interface device S can exhibit a plurality of field device interfaces 303. For example, the data collector S exhibits three analog 4 . . . 20 mA interfaces 303 and three switch interfaces 303. The interfaces 303 are usually set up as outputs, since communication most frequently takes place between the measured values of the field device 100 and the data collector S. However, the field device interfaces 303 can also be designed as inputs during the control of an actuator 100 in order to relay control signals from the data collector S to the actuator 100.

An allocation between the field device interfaces 303 and field device interfaces 201, 300 and 301 can take place in the data collector S or offset interface device S. As a result, any sensors 100 can be set up at the outputs 303, and their signals processed further accordingly. The data collector S can also exhibit a display/control unit for showing the measured values.

In addition, the data collector can be operated via the communications interface 304. The communications port 304 can be designed as an RS-232 interface or Ethernet interface. The data collector S can be remotely operated via the communications network 305 to which the data collector S is connected.

Digitally communicating HART® sensors, analog 4 . . . 20 mA sensors and limit switches can be connected to the wireless transmitter T.

Figure 4:
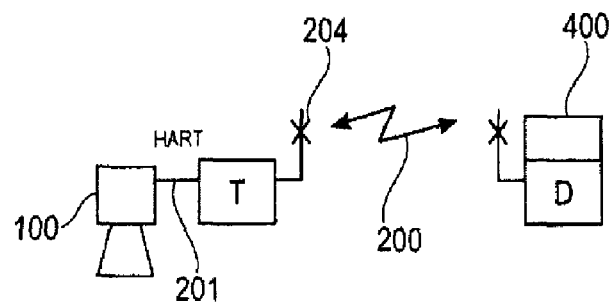
FIG. 4 shows a wireless measured value transmission arrangement with a display unit according to an exemplary embodiment of this invention.

FIG. 4 shows a wireless measured value transmission arrangement with a display unit. A measured value is recorded by means of the sensor 100 on FIG. 4. The measured value is transmitted to the wireless transmitter T via the HART® interface 201, and sent out via the radio interface 204. The measured value is received with the wireless display unit D, and displayed on the display/control unit 400, which is mounted on the wireless display unit D. The wireless transmitter T, the wireless receiver R and the wireless display unit D are based on the same hardware platform. This hardware platform can be made to act as a wireless transmitter T, wireless receiver R or wireless display unit D by setting an operating state.

The wireless display unit D essentially corresponds to a wireless receiver R, in which the measured values are not externally provided via an external field device interface 302, 206 or 202, but are rather relayed to the display/control unit 400 via an internal field device interface, e.g., an I²C interface. The hardware platform of the wireless transmitter T, wireless receiver R and wireless display unit D also has the same I2C sliding contacts, which can be used by the display/control unit 400 to establish a connection to the internal bus.

As a consequence, a display/control unit 400 can be used in addition to the wireless display unit D in the wireless transmitter T and wireless receiver R. The wireless display unit D can be used in the field as a display unit for representing measured values or parameterizing field devices. Since input capability is desired for parameterization, the display/control unit 400 has pushbuttons as the controls, which can be used for entering values.

Figure 5:
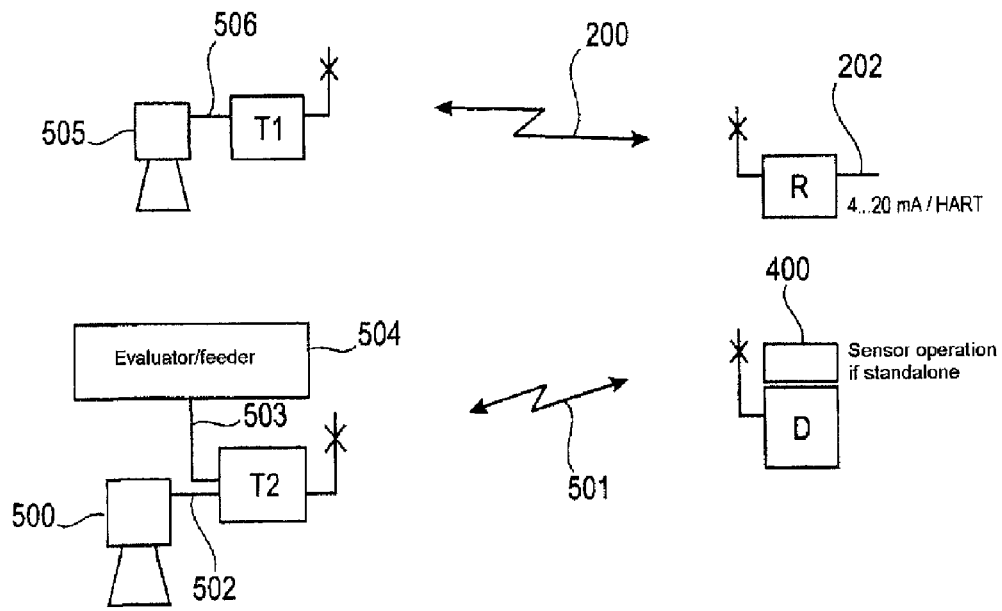
FIG. 5 shows two parallel-operated wireless measured value transmission arrangements according to an exemplary embodiment of this invention.

FIG. 5 shows two parallel operated, wireless measured value transmission arrangements according to an exemplary embodiment of this invention. Since the transceivers R, T, D exhibit an adjustable frequency, varying transceivers R, T, D can be smoothly operated in parallel. In this way, the radio transmission paths 200 and 501 can be decoupled from each other through the use of different frequencies. The frequency can also be switched during transceiver operation, achieving a so-called frequency hopping. Various hopping sequences can here be established, and run through in a specific order.

Since the frequency sequences of the individual devices vary, identical frequencies can be prevented from overlapping to a very great extent.

Alternating the frequencies may also make it possible to reduce susceptibility to errors during radio transmission. For example, local conditions may cause a specific frequency to be cancelled. As a result of frequencies that change during transmission, only a handful of radio telegrams are disrupted by frequency cancellation. However, these disrupted radio telegrams may be reliably transmitted by repeating the transmission.

As a consequence, the analog 4 . . . 20 mA signal of the measuring device 505 can be provided at the output 202 at the same time that the display/control unit 400 displays a signal recorded via a HART® terminal 502. The wireless transmitters T1 and T2 are both in the operating mode that designates them as the transmitter.

In addition, the wireless transmitters T1 and T2 provide varying field device interfaces. For example, the wireless transmitter T1 provides the analog 4 . . . 20 mA signal connection 506, via which the analog measured values of the measuring sensor 505 are interrogated. By contrast, the transmitter T2 provides the HART® connection 502, for example, via which the measured values of the HART® sensor 500 are interrogated.

Figure 22:
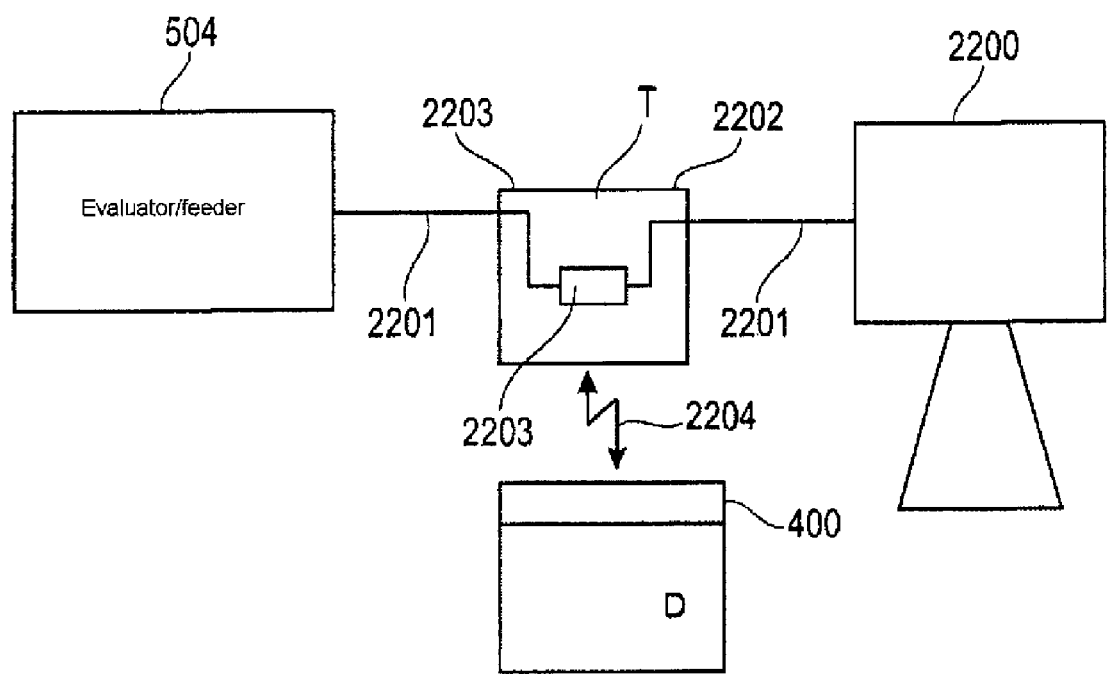
FIG. 22 shows a transceiver looped into an analog bus connection according to an exemplary embodiment of this invention.

FIG. 22 shows that the display/control unit 400 is not limited only to representing signals provided via a HART® terminal. The transceiver T shown on FIG. 22 looped in the analog 4 . . . 20 mA signal connection 2201 of an existing measuring system. In this configuration, the transceiver T is passive. In other words, the transceiver T does not have its own power supply for the sensor 2200. The disconnected analog 4 . . . 20 mA signal bus 2201 is connected at the sensor with the passive 4 . . . 20 mA signal input 2202. The evaluator/supply unit 504 is connected with the passive 4 . . . 20 mA signal output 2203 via the 4 . . . 20 mA signal bus 2201. The loop-in device 2203 connects the analog 4 . . . 20 mA signal bus that was disconnected by the transceiver T. The loop-in device 2201 also ensures that the measured values relayed via the analog 4 . . . 20 mA signal bus 2201 from the sensor 2200 to the evaluator 504 are packed into a radio protocol and transmitted via the radio interface 2204 to the wireless display unit D. Finally, the received data are prepared by the display unit D and shown on the display/control unit 400.

Figure 6:
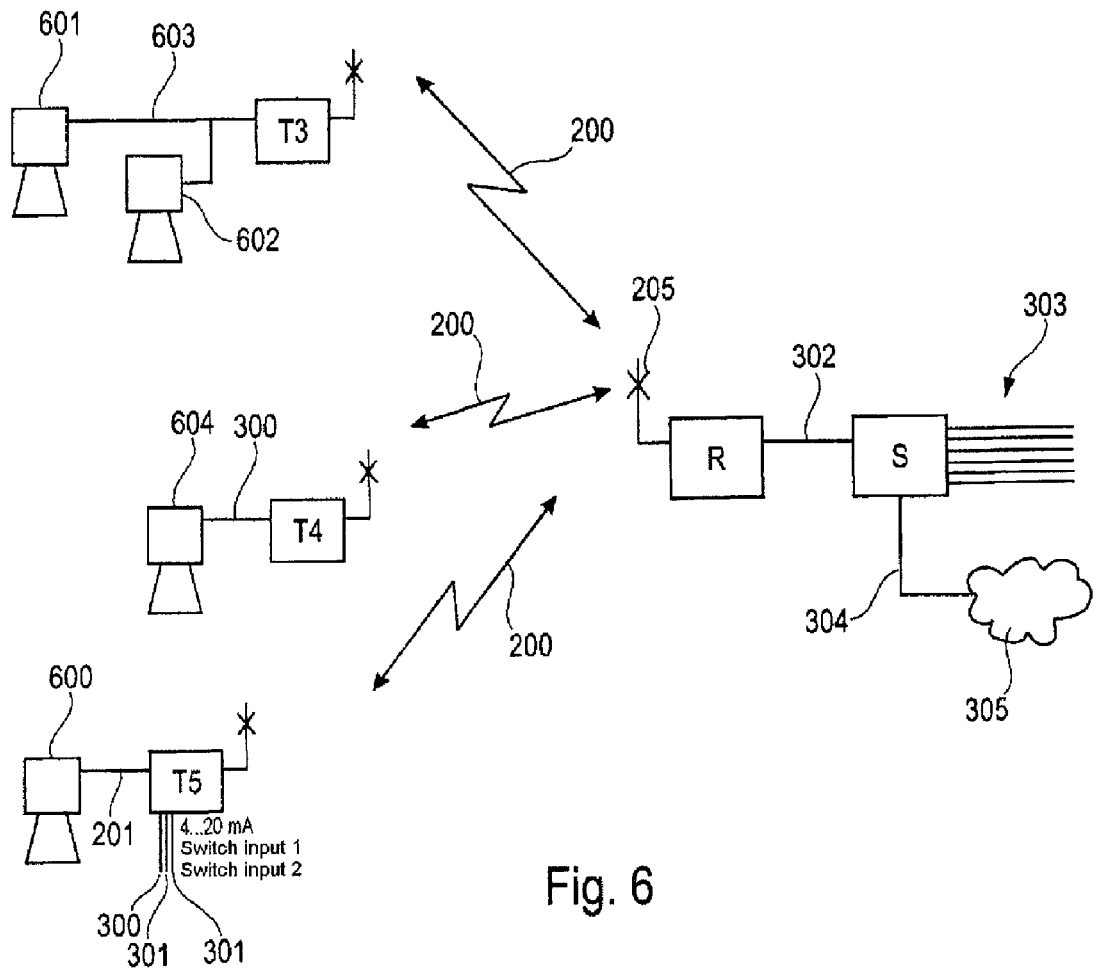
FIG. 6 shows a wireless measured value transmission arrangement with several users according to an exemplary embodiment of this invention.

FIG. 6 shows a wireless measured value transmission arrangement with several users. In this case, the wireless transmitter T3 connects the two HART® sensors 601 and 602 with the wireless receiver R. The HART® sensors 601 and 602 are in the multidrop mode.

The wireless transmitter T4 wirelessly connects the analog sensor 604 with the receiver R. The analog sensor 604 communicates with the wireless transmitter T4 via the analog field device protocol 300, which is configured as a 4 . . . 20 mA signal.

The wireless transmitter T5 connects the HART® sensor 700 with the wireless transmitter T5 via the HART® connection 201.

The wireless transmitter T5 further makes it possible to hook up a 4 . . . 20 mA sensor to the analog terminal 300. In addition, digital sensors, such as fill level limit switches or general limit switches, can be connected to the two switch inputs 301.

All radio signals received by the wireless receiver R via the radio interface 205 are converted by the wireless receiver R into a field bus protocol, bundled and relayed to the data collector S via the field bus connection 302. Individual measuring sensors 600, 601, 604 and 602, 300 and 301 are allocated to the corresponding output interfaces 303 in the data collector S. The data collector S can provide three analog 4 . . . 20 mA signals along with three digital switch inputs. Therefore, the signals of sensors 601, 100 and 600 and the signals of the sensors hooked up to the digital inputs 301 can be generated at the outputs 303.

The allocation of individual remote sensors or field device interfaces 300, 301, 600, 601, 602, 604 to the field device interfaces 303 at the data collector S can take place through address allocation. The wireless transmitter T3 provides the HART® bus 603, to which several sensors 601 and 602 are simultaneously connected in the multidrop mode for digital communication. Each individual sensor 601, 602 can be clearly allocated to an output 303.

Figure 7:
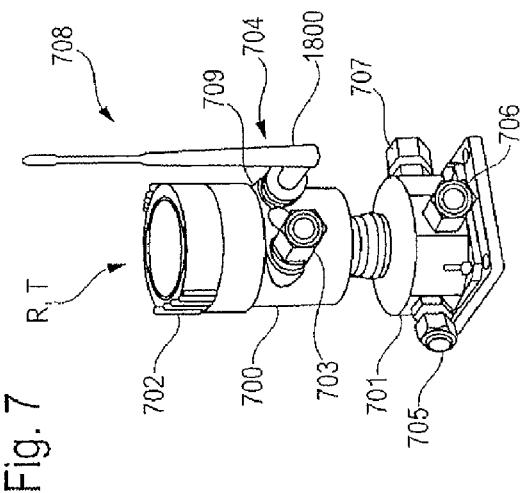
FIG. 7 shows a transceiver in a plastic casing according to an exemplary embodiment of this invention.

FIG. 7 shows a transceiver in a plastic casing according to an exemplary embodiment of this invention. The transceiver R, T is here designed as a wireless transmitter T or a wireless receiver R. For example, a device-specific parameter determines the operating state in which the transceiver R, T is in.

FIG. 7 here shows the casing 708 of a wireless transmitter T or a wireless receiver R. The casing 708 exhibits the top casing module 700 and receptacle casing module 701. The receptacle casing module shows the lead wires 705, 706 and 707, wherein the lead wire 707 is designed as a lead wire for the 4 . . . 20 mA signal terminal for a field device interface, and the lead wire 706 is designed as a lead wire to the HART® terminal, while the lead wire 705 is designed as a lead wire to the digital terminals or switch inputs. The top casing module 700 exhibits the twist-off cover 702, which provides access to the interior of the top casing module.

A terminal 703 for power supply purposes is also provided at the top casing module 700, and the radio interface 704 or antenna 704 is additionally arranged at the top casing module 700. The antenna 704 is secured to the top casing module 700 by an M20×1.5 709 or, alternatively, a ½" NPT terminal thread 709. The antenna 704 is secured at a right angle to the casing via screwed joint 709, and can be bent to an angle of essentially 900 via the joint 1800, so that the antenna 704 runs essentially parallel to the casing wall of the top casing module 700.

The casing 708 is modular in design. The top casing module 700 and the receptacle casing module 701 can be combined to form the casing, so that the receptacle casing module can be detached form the top casing module. The receptacle casing module 701 provides a physical interface for the top casing module, in particular for a circuit incorporated in the top casing module 700. The operating state is determined based on the interface used in the receptacle casing module 701 or the setting of the circuit in the top casing module 700, which in turn determines whether the transceiver 708 acts as a transmitter T or receiver R.

In order to set the corresponding operating state, the receptacle casing module can be coded in such a way that the circuit in the top casing module detects the respectively connected receptacle casing module, and can hence independently or automatically set the respective operating state R, T.

Figure 8:
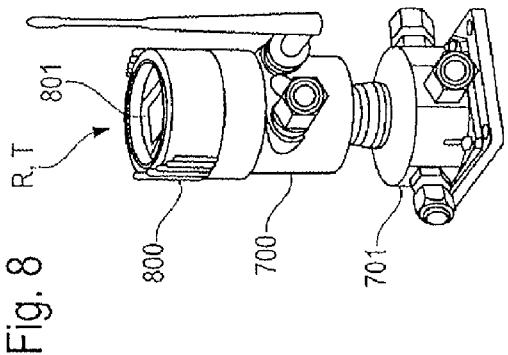
FIG. 8 shows a transceiver with a display/control unit in a plastic casing according to an exemplary embodiment of this invention.

FIG. 8 shows a transceiver with a display/control unit in a plastic casing according to an exemplary embodiment of this invention. Using a plastic casing makes it possible to use the transceiver 708 in an acid-loaded environment. In other words, the plastic casing protects a circuit incorporated in the casing against the effect acid-loaded ambient air would have on the circuit.

The structural design of the casing essentially corresponds to the casing shown on FIG. 7. As opposed to the casing depicted on FIG. 7, the top casing module 700 has a terminal casing or a cover 800 elevated by comparison to cover 702 that accommodates the display/control unit 801.

Figure 9:
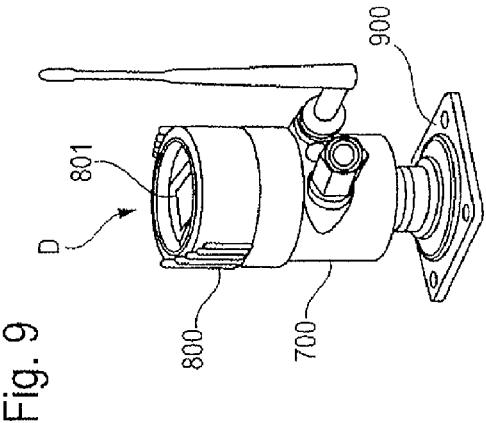
FIG. 9 shows a transceiver with floor plate in a plastic casing according to an exemplary embodiment of this invention.

FIG. 9 shows a transceiver with floor plate in a plastic casing according to an exemplary embodiment of this invention. The top casing module 700 again corresponds to the top casing module for a wireless transmitter T and a wireless receiver R. The casing depicted on FIG. 9 is used in conjunction with the display/control unit 801 arranged in the casing to display radio signals or the field device signals contained in the radio signals. The floor plate 900 can be used to secure the top casing module 700 along with the elevated cover 800 and the display/control unit 801 to a wall.

The floor plate 900 provides no interfaces, since the measured value is processed internally in the casing 708, so that the measured value need not be relayed to another external device. A control circuit of the transceiver can detect that the casing floor plate 900 instead of an interface device 701 has been attached as the receptacle casing module, and the control circuit can shift the transceiver into an operating mode for measured value display or operation as a display unit.

Figure 10:
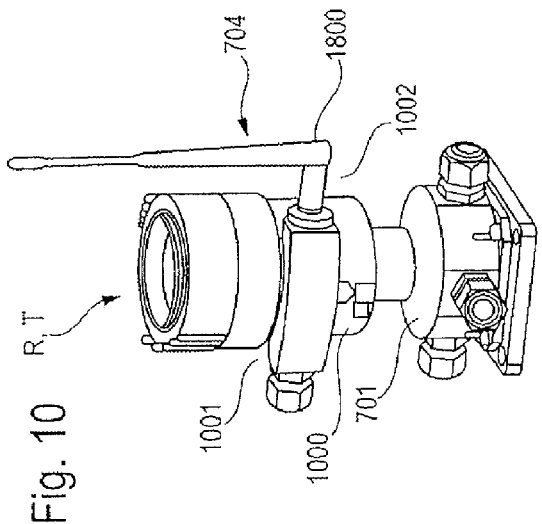
FIG. 10 shows a transceiver in an aluminum casing according to an exemplary embodiment of this invention.

FIG. 10 shows a transceiver in an aluminum casing. The aluminum top casing module 1000 has a high mechanical stability under load.

The receptacle casing module 701 corresponds to the receptacle casing module of the plastic casing, and is also made out of plastic. The terminal casing 701 or receptacle casing module 701 can again be changed out and provide the top casing module 1000 with different physical interfaces.

Figure 11:
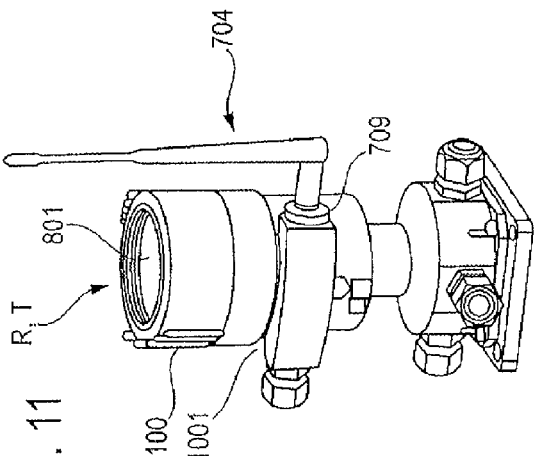
FIG. 11 shows a transceiver with a display/control unit in an aluminum casing according to an exemplary embodiment of this invention.

FIG. 11 shows a transceiver with a display/control unit in an aluminum casing according to an exemplary embodiment of this invention. A cover 1100 elevated relative to the cover 702 is also provided in the aluminum casing 1001 to accommodate the display/control unit 801, making it possible to operate the display/control unit 801 on a transmitter T or a receiver R. The antenna 704 is secured to the top casing module 1001 with the screwed joint 709.

Figure 12:
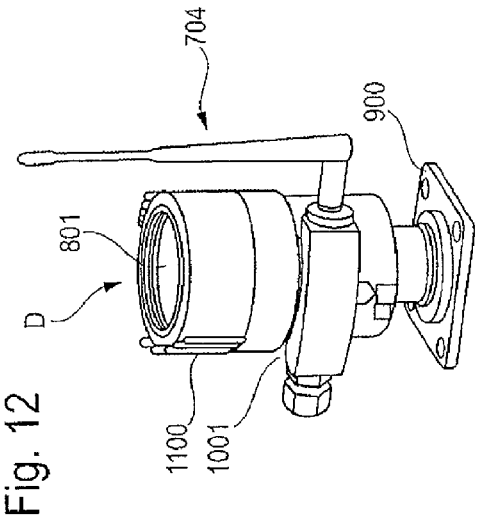
FIG. 12 shows a transceiver with floor plate in an aluminum casing according to an exemplary embodiment of this invention.

FIG. 12 shows a transceiver with a floor plate in an aluminum casing. The aluminum casing 1001 and the aluminum cover 1100 correspond to the casing with the cover on FIG. 11. Since the transceiver D is only to be used for measured value display, a receptacle casing module was omitted, and the floor plate 900 was instead attached to the top casing module 1001.

Figure 13:
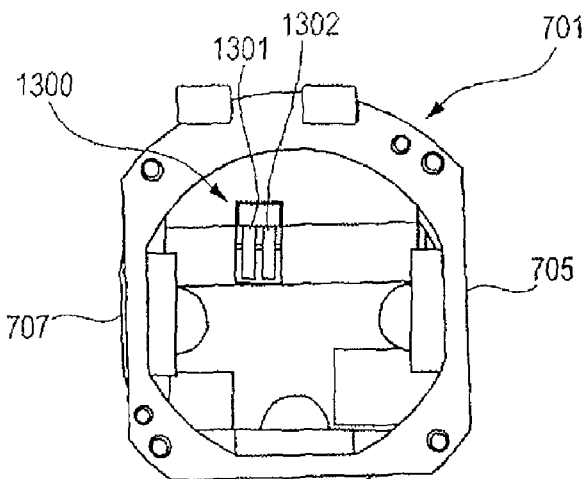
FIG. 13 shows a receptacle casing module with a terminal for a two-conductor field device according to an exemplary embodiment of this invention.

FIG. 13 shows a receptacle casing module with a terminal for a two-conductor field device according to an exemplary embodiment of this invention. FIG. 13 shows a view of the bottom side of a receptacle casing module 701. The receptacle casing module 701 exhibits the openings 705, 706 and 707, through which a connecting cable can be introduced into the receptacle casing module, for example. The receptacle casing module 701 provides the terminal 1300. The terminal 1300 can here be configured both as an active HART® input or passive HART® input, an active HART® output or active 4 . . . 20 mA signal output.

While the terminal 1300 can be configured by setting the transceiver, configuration can also be recognized by the transceiver T, R, D using an identification or code on the receptacle casing module 701. An operating state of the transceiver T, R, D can be set based on the provided interface 1300.

The terminal 1300 exhibits clamps 1301 and 1302. Clamp 1301 here denotes a positive clamp, while claim 1302 denotes a negative clamp. The determination of whether the terminal 1301 is configured as an input or output in turn depends on the operating state the transceiver is in.

Figure 14:
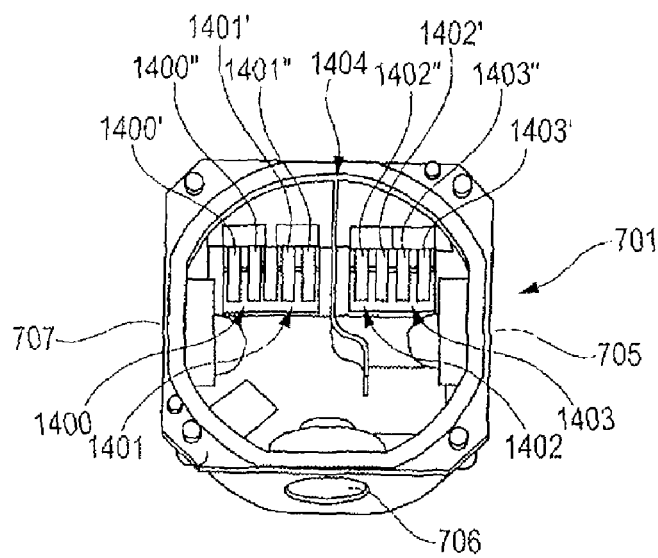
FIG. 14 shows a receptacle casing module with several terminals for field devices according to an exemplary embodiment of this invention.

FIG. 14 shows a receptacle casing module with several terminals according to an exemplary embodiment of this invention. Also visible on FIG. 14 is the bottom side of a receptacle casing module 701 with the openings 705, 706 and 707. The receptacle casing module exhibits terminals 1400, 101, 1402 and 1403. The terminal 1400 can be configured as an active analog 4 . . . 20 mA input or passive analog 4 . . . 20 mA input. The terminal 1401 can be configured as an active input with digital communication or as a passive input with digital communication, as an active output with digital communication or as an active 4 . . . 20 mA output. The data collector S can be connected to the active output with digital communication. An SPS can be connected to the active 4 . . . 20 mA output. The wireless transmitter T acts as the master relative to a sensor connected to the wireless transmitter T, and waits for a response from the sensor, which is configured as the slave.

The wireless receiver R is set up as a slave relative to the receiver R, and responds to inquiries from the data collector S.

Terminals 1400 and 1401 are intrinsically safe, meaning that internal measures were taken to satisfy requirements which may make it possible to connect sensors located in an explosion protection range to the transceiver T, R, D and operate them. For example, the maximum short-circuit current arising at the terminals 1400 or 1401 is limited.

The separating wall 1404 is provided for separating the intrinsically safe area from a non-intrinsically safe area. The two digital inputs 1402 and 1403 are arranged in the non-intrinsically safe area. The analog terminal 1400 exhibits the positive terminal clamp 1400' and the negative terminal clamp 1402'. Terminal 1401 exhibits the positive terminal clamp 1401' and the negative terminal clamp 1401". The digital input 1402 exhibits the negative terminal clamp 1402" and the positive terminal clamp 1402'.

The second digital input 1403 exhibits the negative terminal clamp 1403" and the positive terminal clamp 1403'. Terminal clamps 1301, 1302, 1400', 1400", 1401', 1401", 1402', 1402", 1403' and 1403" are designed as spring-loaded clamps for a cable diameter of 2.5 mm$^2$.

The varying configuration of a transceiver, in particular the varying operating states, makes it possible to distinguish between different configurations for terminals 1300, 1400, 1401, 1402 and 1403.

If the transceiver is configured as a wireless transmitter T, terminals 1300, 1400, 1401, 1402 and 1403 are configured as inputs. HART®-compatible field sensors can be connected to a HART® input. A HART® input makes it possible to distinguish between the active and passive mode. The modes can be switched by configuring a parameter, stipulating the firmware or defining the operating state, for example. In the operating mode, the supply voltage is provided for operating the connected sensors at clamps 1300, 1400 and 1401, both for an input and an output. Given an active output, the transceiver R, T, D supplies a current to the terminal clamps 1300, 1400 and 1401. In the passive mode, sensors with an internal power supply can be connected.

In other words, this means that a two-conductor sensor can be connected to an active HART® input, since a supply voltage can be provided to the sensor via the active input. By contrast, the two-conductor sensor provides digital measured values to the active input. An active 4 . . . 20 mA signal input also provides a supply voltage for a sensor, and the connected 4 . . . 20 mA sets a current corresponding to the measured value. The latter can be measured from the transceiver T, e.g., by means of a laboratory resistor.

By contrast, a passive input is an input that provides no supply voltage to a connected sensor. As a consequence, a four-conductor device with an external power supply can be connected to a passive HART® input. A passive 4 . . . 20 mA input is used to determine an analog current that corresponds to a measured value. However, the passive 4 . . . 20 mA input does not provide any supply voltage. The latter is provided by an external power source, for example. The sensor uses the external voltage to set a current that can be measured in the transceiver T via a laboratory resistor.

An active output of the transceiver R acts as an active output of a sensor. An active output of a transceiver R here exhibits a power supply, and drives a current corresponding to the measured value at the active output. The active output acts as a current source.

In a passive output, an external power supply is provided. The external power supply is used to draw a current through the passive output corresponding to the measured value. The passive output acts as a current sink.

In the operating state where the transceiver works as a wireless transmitter T, a field device interface 1300, 1400, 1401, 1402 and 1403 is connected with a field device 100, 500, 505, 600, 601, 602 and 604. The wireless transmitter acts as a HART® master for communicating with the field device 100, 500, 505, 600, 601, 602 and 604 via a HART® bus 1300, 1401, wherein the wireless transmitter can act both as a primary master and secondary master. A second master on the HART® bus can here be permitted. The current operating state is determined to set the HART® master.

As the HART® master, the wireless transmitter T is designed to transmit commands to field devices 100, 500, 505, 600, 601, 602 and 604, and hence to interrogate the field devices 100, 500, 505, 600, 601 and 602.

Up to three HART® sensors can be connected to a terminal clamp 1300 or 1401. If three sensors are connected, HART® addresses #1, #2 and #3 are used. If only one sensor is connected, this sensor 100, 500, 505, 600, 601, 602 and 604 can utilize addresses #0, #1, #2 or #3. If several HART® sensors are connected, they are parallel-connected with the terminal clamp 1300 or 1401.

The terminal 1400 is configured as a 4 . . . 20 mA input. An active mode and passive mode are here also possible for the analog 4 . . . 20 mA input 1400. In the active mode, the terminal 1400 has a voltage, and the current flowing over a connected sensor is measured.

In the passive mode, the wireless transmitter T is looped into an electric circuit as shown on FIG. 22, for example, and the current flowing through the wireless transmitter T is measured in order to obtain the measured value provided by a sensor 2200 in this way.

The transceiver R, T, D can also be switched between the active mode and passive mode via a configuration, a firmware setting or detection of operating state or detection of receptacle casing module.

The wireless transmitter T also exhibits the digital switch inputs 1402 and 1403. Any switches, such as float switches or relays, can be connected to these digital switch inputs. Limit switches with an open collector can also be used, wherein the sensor here requires its own power supply.

If the transceiver is operated at the evaluator, i.e., in a second operating state or as a wireless receiver R, the interfaces 1300 and 1401 can be configured as a HART® output. The HART® outputs 1300 and 1401 here operate as active HART® outputs, i.e., as current sources.

The wireless receiver R acts as a slave for communicating with the data collector S connected to the output 1300, 1401 with digital communication. Communication here takes place between the data collector S and the wireless receiver according to a protocol similar to a proprietary HART® protocol. This means that the wireless receiver R is designed to receive commands via the HART® interface 302, 1300 and 1401 and process them further to prepare a measured value. However, these commands can differ from HART® commands.

Due to the fact that the radio path can result in delays in the response behavior, a proprietary protocol can be introduced between the connection of the wireless receiver R and the data collector. A special chronological behavior based on delays on the radio path 200 can here be taken into account. The protocol running between the wireless receiver R and data collector S on the connector 302 can here deviate from the standard HART® protocol.

When using the transceiver in the second operating state, terminals 1300, 1400 and 1401 can be configured as analog 4 . . . 20 mA outputs. Hence, they can be directly connected with an evaluator or memory-programmable controller as a standalone device. As a result, an offset interface device is no longer necessary for providing interfaces. The analog output 1300, 1400 and 1401 can be connected to any passive analog input of an evaluator.

If the terminal clamps 1300, 1400 and 1401 are set up as 4 . . . 20 mA outputs, they operate actively, i.e., as a current source. The current provided at the current output 1300, 1400 and 1401 of a transceiver configured as a wireless receiver R is variable within the 4 to 20 mA range. Therefore, the wireless receiver R determines the sensor value made available to it by the wireless transmitter T. This sensor value resulted from an interrogation of the sensor 100 by the wireless transmitter T. The wireless transmitter T relays the sensor value to the wireless receiver R as a percentage value ranging from 0 to 100%. In turn, R converts the received percentage value back into a current value, so that 0% reflects an output current of 4 mA, and 100% reflects an output current of 20 mA. R makes the reconverted current value available at its output 302, and in particular at the output clamps 1300, 1400 and 1401. In this case, R acts as a proxy, i. e., an intermediate memory for a measured value.

How the wireless receiver R acts given a malfunction is freely selectable. The possible options are as follows:
  The last current value applied to output 302 remains intact;
  The current value applied to output 302 assumes a value of 0 mA;
  The current value applied to output 302 assumes a value of 20.5 mA;
  The current value applied to output 302 assumes a value of 22 mA,;
  The current value applied to output 302 measures 0% (e.g., 4 mA) or 100% (e.g., 20 mA).

Figure 15:
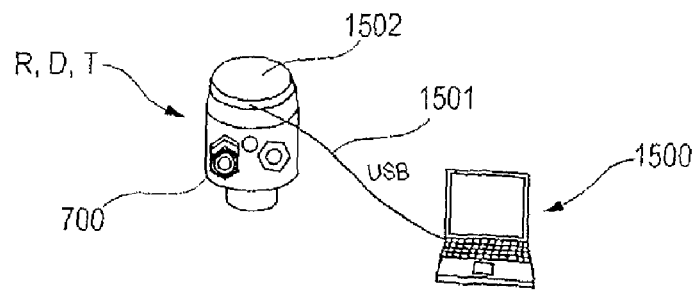
FIG. 15 shows an arrangement for parameterizing a transceiver according to an exemplary embodiment of this invention.

FIG. 15 shows an arrangement for parameterizing a transceiver according to an exemplary embodiment of this invention. To parameterize the transceiver R, D, 5, which on FIG. 15 is represented by the top casing module 700, the parameterizing device 1500, e.g., a PC, is hooked up to a parameterization adjuster 1502 via the connection 1501, e.g., a USB (universal serial bus) connection. The parameter adjuster 1502 can here be connected to the sliding contacts of the internal field device interface of the I²C interface of the transceiver.

The display/control unit 801 can also be used for parameterization. To this end, a parameterization for a transceiver can be stored in the memory of the display/control unit. The display/control unit 801 or parameterization device 801 can be coupled with the transceiver. For example, the operating state or an address for one or more transceivers can be stored on the parameterization device 801.

The parameterization device 801 can then be coupled to a transceiver to be parameterized. The transceiver detects a parameter stored in the display/control unit 801 for the corresponding transceiver, and can extract the relevant parameters for parameterization. The operating state and particularly the behavior of the transceiver can here be set. Therefore, the corresponding transceiver arrangement can be set to be a wireless receiver or wireless transmitter. After the transceiver arrangement has been parameterized, the corresponding parameter entry for the corresponding transceiver can be deleted by the display/control unit, and the display/control unit 801 can be switched to another transceiver for parameterization.

This process eliminates the need for expert personnel to be present on-site for configuring a transceiver, since parameterization can also be performed by untrained persons via the display/control unit.

Figure 16:
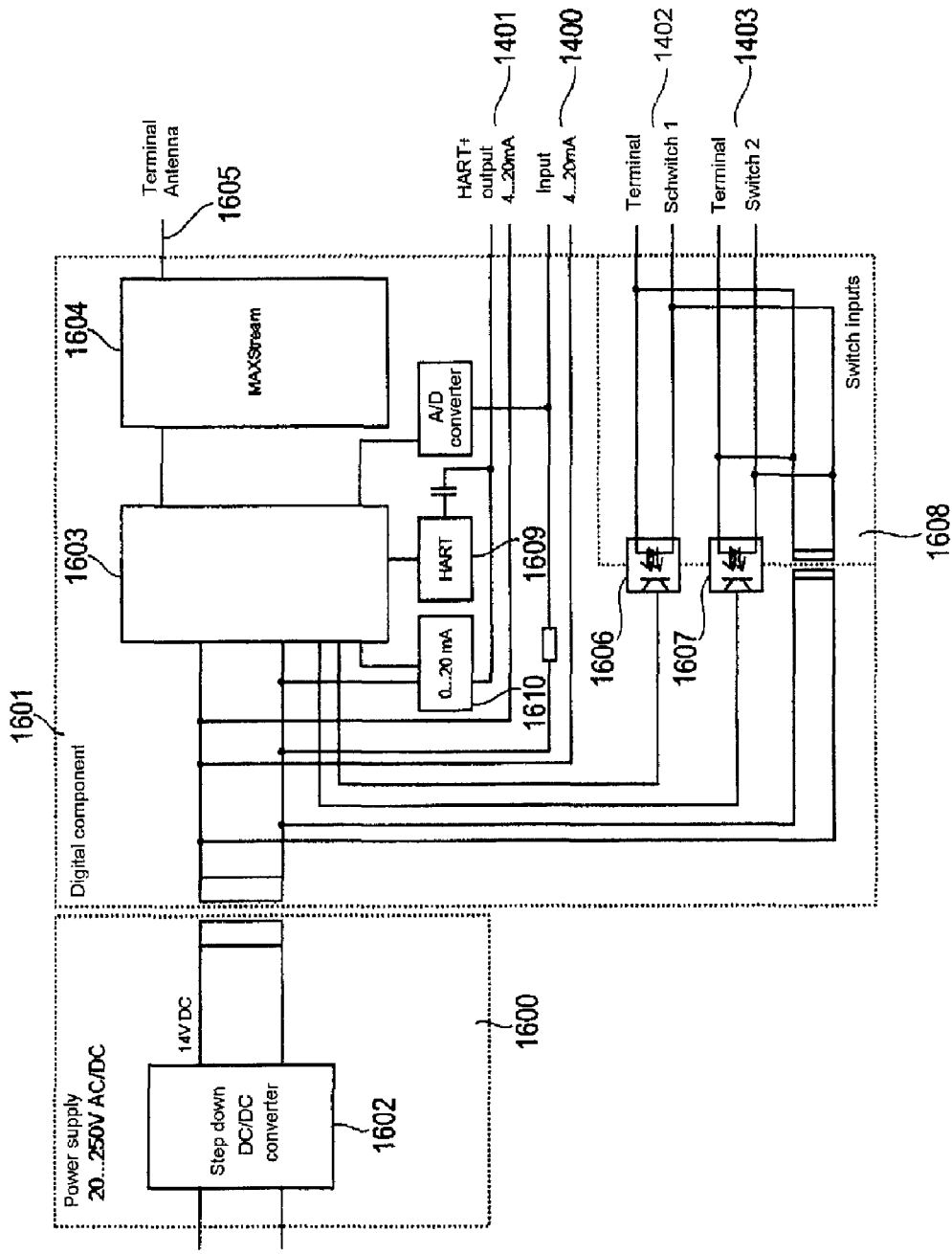
FIG. 16 shows an overview block diagram of a transceiver according to an exemplary embodiment of this invention.

FIG. 16 provides an overview block diagram of a transceiver according to an exemplary embodiment of this invention. The power supply 1600 with voltage transformer 1602 is visible on FIG. 16. This voltage transformer 1602 provides a supply voltage source for the transceiver T, R, D. The supply voltage source provides the digital component 1601 with voltage.

The digital component 1601 of the transceiver is used to evaluate the input and output signals, and to determine the operating state. The conversion circuit 1603 on the digital component 1601 controls the conversion of field device interface signals into radio signals. Depending on the operating state selected, the conversion circuit 1603 receives radio signals of the radio module 1604 given a wireless receiver R, and converts the latter via the conversion circuit 1603 into signals that can be provided at the field device interface 1401.

If the transceiver is configured as a wireless transmitter T, the conversion circuit 1603 receives signals supplied at the inputs 1401, 1400, 1402 or 1403 by field devices, and converts these received signals into radio signals. The conversion circuit 1603 relays the radio signals on to the radio module 1604, and the radio module 1604 finally beams out the radio signals via the antenna 1605.

The digital inputs 1402 and 1403 are connected with the conversion device via the optocouplers 1606 and 1607. Using the optocouplers 1606 and 1607 galvanically separates the outputs. Also used for galvanic separation is the transformer 1608, which supplies the light-emitting diodes 1606 and 1607 of the optocouplers with current.

If the transceiver is configured as a wireless receiver R, a HART® signal is provided at the field device interface 1401 by the HART® interface circuit 1609. The interface 1401 can also be configured as an analog signal output, wherein the signal interface circuit 1610 then effects conversion into a corresponding analog signal.

Figure 17:
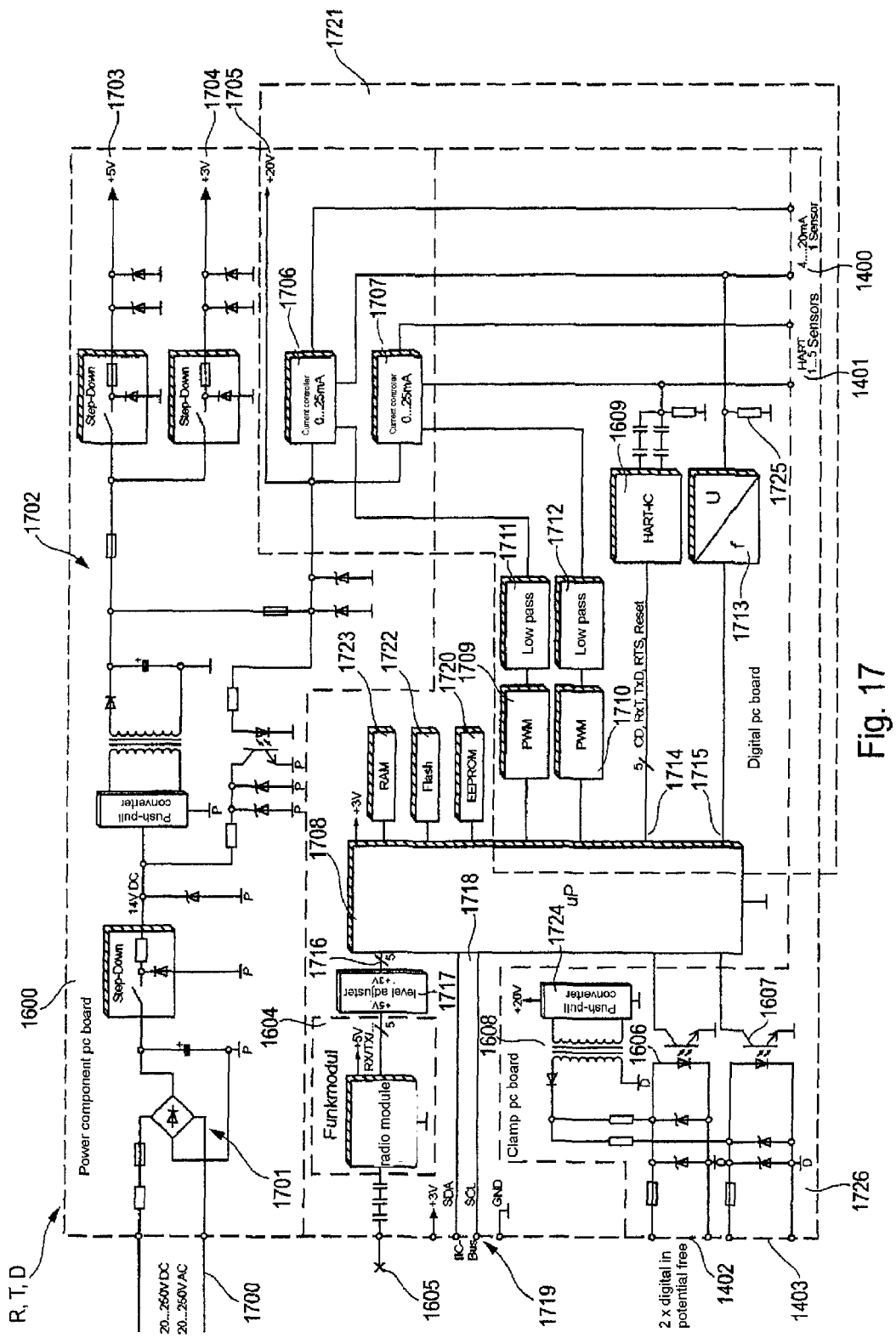
FIG. 17 shows a block diagram of a transceiver according to an exemplary embodiment of this invention.

FIG. 17 shows a block diagram of a transceiver R, T, S according to an exemplary embodiment of this invention. The circuit shown on FIG. 17 describes the shared hardware platform for the wireless receiver R, the wireless transmitter T and the wireless display unit D.

The circuit exhibits power supply 100. A d.c. or a.c. voltage that is provided at the input 1700 ranging from 20 to 250 V, e.g., furnished to the transceiver R, T, D via the opening 703, arrives at the rectifier circuit 1701, is converted by the circuit interface circuit 1702 into the internal supply voltages of 5 V (1703), +3 V (1704) and +20 V (1705), and made available to the circuit. The supply circuit 1600 is also used to supply power for the analog output 1400 via current controller 1706, and supply power for the HART® output 1401 via the current controller 1707.

The current of the current controllers 1706 and 1707 to be set is provided via the microprocessor 1708 and the pulse width modulation circuit 1709 and 1710, and the low-pass circuit 1711 or 1712. The HART® interface device 1609 or the HART® IC 1609 is used for receiving and interpreting HART® commands, or measured values in the HART® format provided via the terminal 1401. The HART® IC is here responsible for modulating or demodulating the digital data. It converts the binary information in the two frequencies 1200 Hz for logical "1" and 2200 Hz for logical "0".

The voltage frequency conversion circuit 1713 determines the current provided at the analog input 1400, e.g., by a 4 ... 20 mA sensor, and routes it to the processor 1708. The current here corresponds to a measured value as determined by the 4 ... 20 mA sensor. To determine the current, the current flowing in the 4 ... 20 mA input 1400 is converted into a voltage at the laboratory resistor 1725. The U/F transformer (voltage-frequency transformer) changes this voltage into a frequency proportional to the voltage. The frequency is routed to the microprocessor 1708 at the port 1715 and evaluated by the microprocessor 1708. In this way, the microprocessor 1708 has the measured value as determined by the sensor in the form of the measured frequency. This value can be transmitted via the radio interface 1605 after correspondingly converted.

The microprocessor 1708 is used to record the HART® signals via the five interface lines 1714, and record analog signals in the form of a frequency via the pin 1715.

The determined values can be converted into radio signals by the processor 1708 and provided to the radio module 1604 at the five signal lines 1716 by way of the level adaptor circuit 1717. The level adaptor 1717 limits the power to a maximum value, while the radio module 1604 selects the radio frequency. Finally, the radio signals are relayed to the antenna 1605 via the radio module, and are transmitted via the air interface.

The microprocessor 1708 also provides the internal field device interface 1718 at which the values corresponding to the $I^2C$ protocol are prepared for a display, e.g., via the sliding contacts 1719. The selected operating state for the transceiver R, T, D can be filed in the EPROM 1720 (erasable programmable read-only memory). The respective value can be manually input or determined based on the used receptacle casing module.

In addition, the transceiver R, T, D has a static memory 1723 and a flash memory 1722, which both are connected with the microprocessor 1708. For example, the flash memory 1722 stores the firmware of the transceiver R, T, D. Depending on the role assumed by the transceiver during wireless communication, the corresponding firmware can be loaded or executed.

The block diagram on FIG. 17 also depicts the clamp circuit 1726. The terminals 1400, 1401, 1402 and 1403 shown on the clamp circuit 1720, the optocouplers 1606, 1607, the transformer 1608 and the push-pull converter 1724 are essentially incorporated in the receptacle casing module 701. By contrast, the power supply circuit 1600 and digital circuit 1721 along with the microprocessor 1708 and radio module 1604 are incorporated in the top casing module 700.

The digital circuit 1721 encompasses the pulse width modulators 1709, 1710, the low-pass filters 1711. 1712, the HART® interface device 1609 and the voltage-frequency conversion circuit 1713.

The clamp circuit 1726 encompasses the first digital terminal 1402 and the second digital input 1403. The digital input 1402 leads to the optocoupler 1606 and the microprocessor 1708. In like manner, the second digital input 1403 leads to the microprocessor 1708 by way of the optocoupler 1607. The light-emitting diodes of the optocouplers 1606 and 1607 are provided with current via the transformer 1608.

The clamp circuit also exhibits the HART® input 1401, HART® output or the 4 ... 20 mA output 1401, along with the analog 4 ... 20 mA input 1400. The microprocessor 1708 here determines whether the terminal 1401 functions as a HART® input, a HART® output or a 4 ... 20 mA signal output.

The supply circuit 1600, radio module 1604, microprocessor 1708 and digital circuit 1721 are present for the transceiver independent of the operating state as a wireless transmitter T, wireless receiver R or wireless display unit D. However, the terminal circuit 1726, and hence the clamp circuit 1726, can be changed by switching the receptacle casing module 701. Whether the inputs or outputs 1400, 1401, 1402 or 1403 are configured as inputs or outputs depends on the respective operating state of the transceiver R, T, D.

Figure 18:
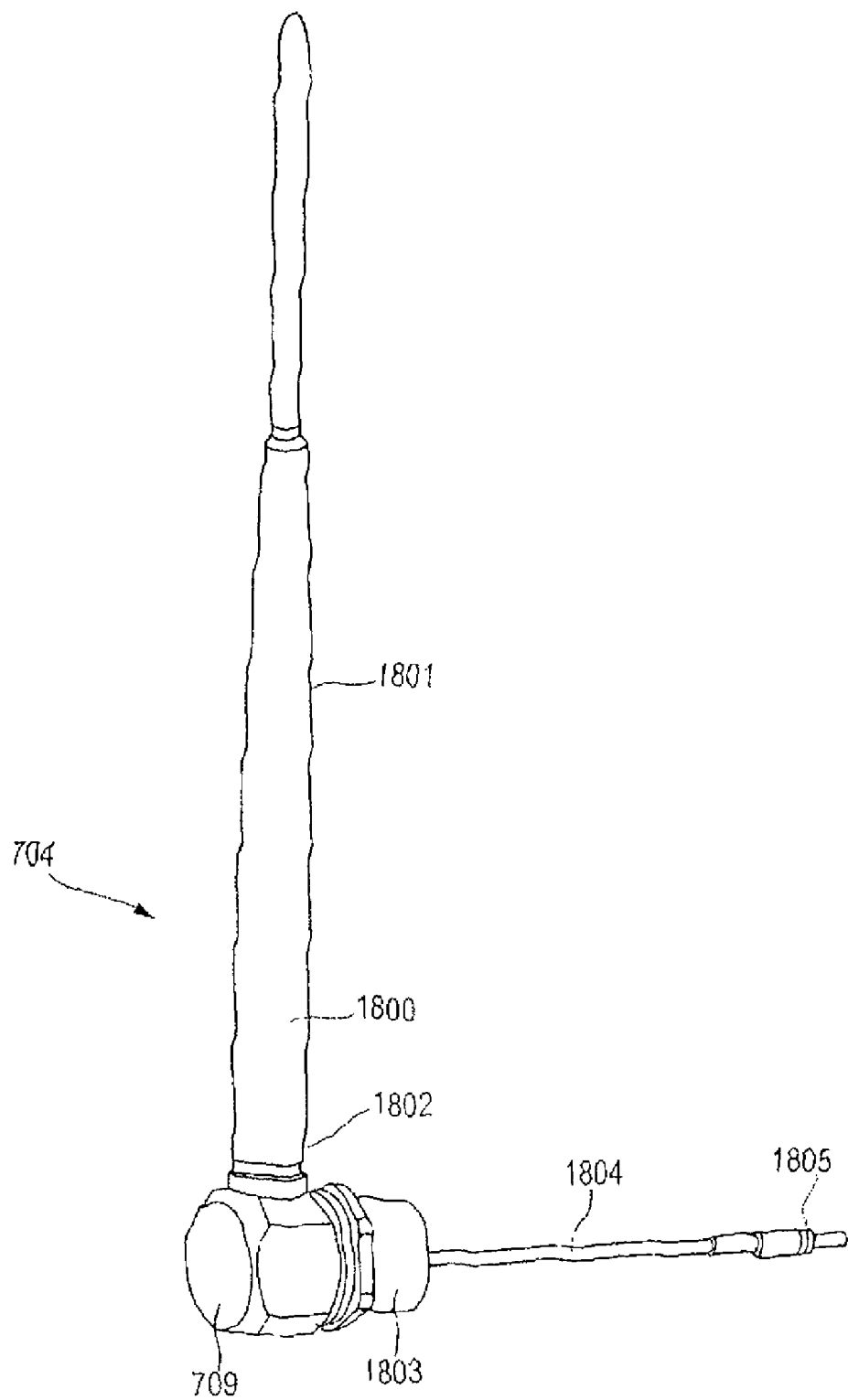
FIG. 18 shows a perspective view of an antenna according to an exemplary embodiment of this invention.

FIG. 18 shows a perspective view of an antenna according to an exemplary embodiment of this invention. The antenna 704 here exhibits the articulated joint 1800. The articulated joint 1800 can be used to set an angle between the antenna rod 1801 and the antenna attachment 1802 ranging from 90° to 270°. FIG. 18 shows an angle of 180° between the antenna attachment and antenna rod 1801. The antenna attachment 1802 exhibits an angle of 90° relative to the axis of the thread 1803.

The screwed connection 709 can be used to establish a connection between the antenna rod 1801 and the top casing module 700. The attachment thread 1803 can be used to secure the antenna rod 1801 and the threaded joint 709 on the top casing module 700. The thread 1803 can be designed as an M20×1.5 or alternatively as ½" NPT thread. The electrical connection between the antenna and radio module 1604 can be established via the coaxial cable 1804 and the coaxial plug 1805.

Figure 19:
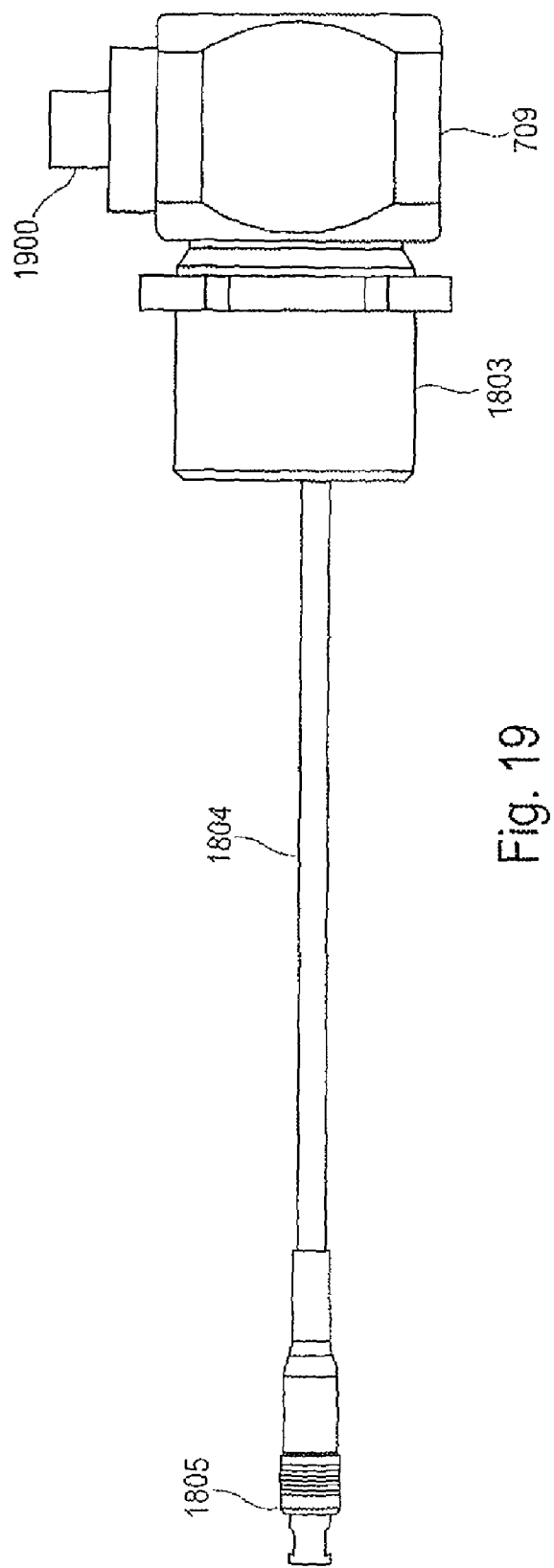
FIG. 19 shows a side view of an attachment element for an antenna according to an exemplary embodiment of this invention.

FIG. 19 shows a side view of an attachment element for an antenna according to an exemplary embodiment of this invention. FIG. 19 depicts the threaded joint 709. The antenna rod 1801 and in particular the antenna attachment 1802 can be coupled to the coaxial antenna terminal 1900. The axial direction of the coaxial antenna terminal 1900 is at a right angle to the axial direction of the screw thread 1803. The threaded joint 709 is made out of metal, and incorporates the coaxial cable 1804, the right end of which in relation to FIG. 19 ends at the antenna terminal 1900. The left end exhibits the coaxial plug 1805 for coupling with the radio module 1605.

Figure 20:
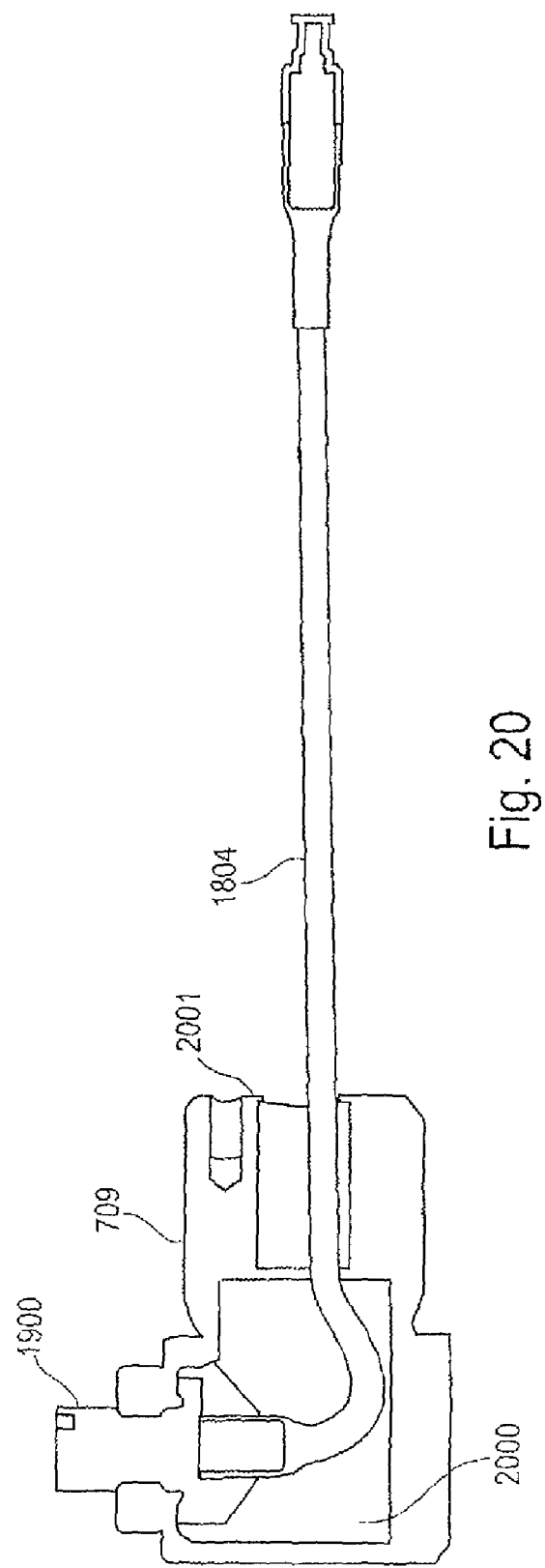
FIG. 20 shows a sectional view of an attachment element for an antenna according to an exemplary embodiment of this invention.

FIG. 20 shows a sectional view of an attachment element for an antenna according to an exemplary embodiment of this invention. FIG. 20 depicts the internal structure of the connecting element 709. The coaxial terminal plug 1900 is coupled with the coaxial conductor 1804 inside the attachment element 709. In the first cavity 2000 of the attachment element 709, the coaxial line 1804 is deviated at a prescribed bending radius, so that it can exit the borehole 2001. As a result, an antenna secured to the coaxial plug 1900 can be arranged parallel to the top casing module wall.

Figure 21:
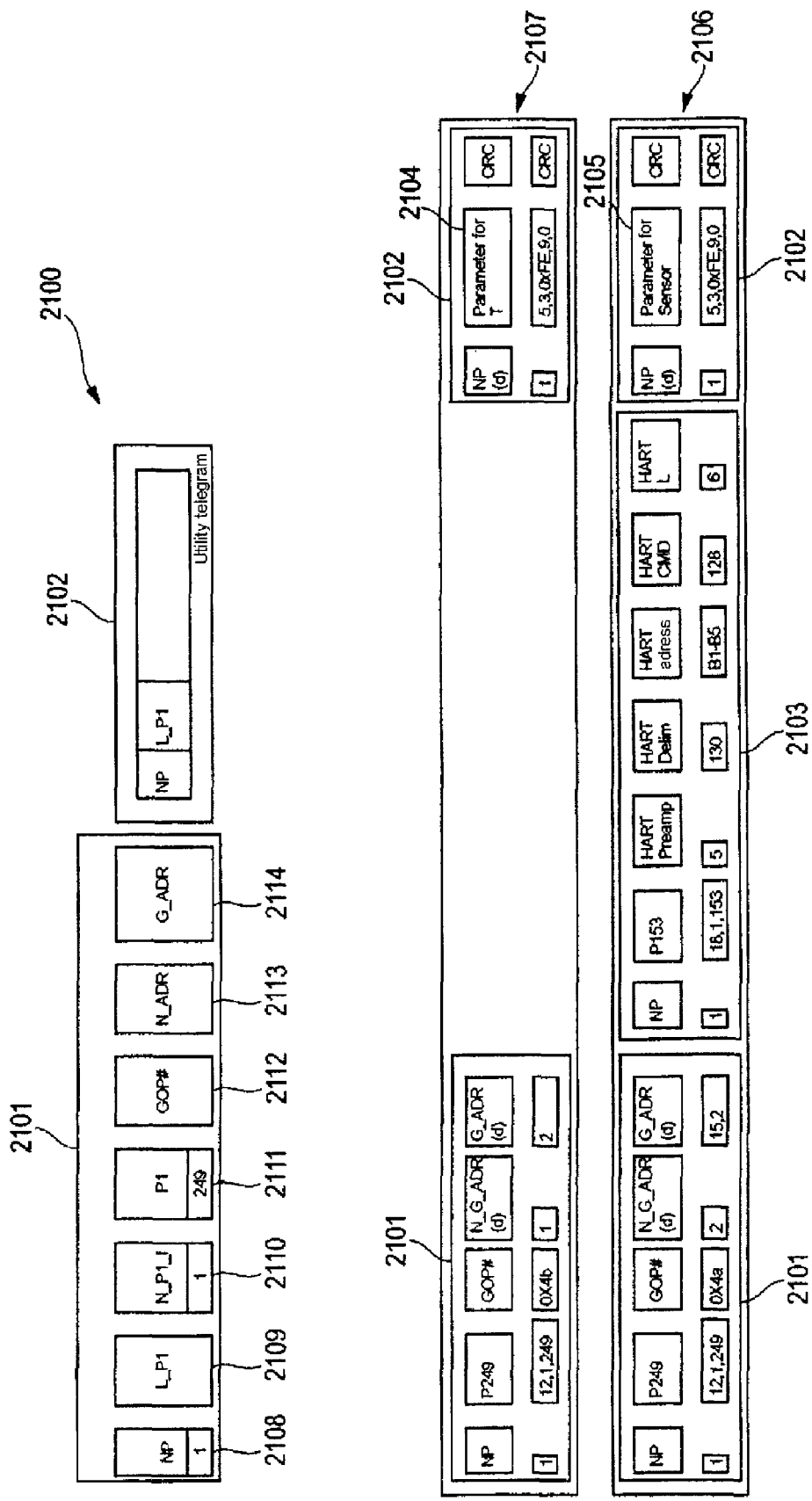
FIG. 21 shows a message format of a proprietary transmission protocol according to an exemplary embodiment of this invention.

FIG. 21 shows a message format for a proprietary transmission protocol according to an exemplary embodiment of this invention. This message format is used, for example, in the wireless measured value transmission arrangement shown on FIG. 3, for purposes of communication between the data collector S and the wireless receiver T [sic] or between the data collector S and the sensor 100.

The expanded message format, in particular the expanded data packet 2100, exhibits the protocol expansion 2101 and utility telegram 2102. The protocol expansion 2101 encompasses the parameter NP 2108, which is permanently set to 1. The length field L_P1 2109 encompasses the length of the utility telegraph 2102 in addition to the value stored in the field 2113 plus the value 5. The field N_P1_I 2110 always has the constant value 1. The parameter field P1 2111 is provided with a parameter value that imparts the instruction to hand over the packet to a data collector S or a parameterization device. The protocol expansion 2101 further encompasses the field GOP#2112 and field N_ADR 2113. Finally, the protocol expansion 2101 encompasses the field G_ADR. The number of existing fields N_ADR 2113 can be used to determine the device for which a message or telegram is determined. This is because, when routing a packet via the different evaluators, parameterization devices or transceivers, each device through which the packet passes scans the address information N_ADR 2113, and removes the corresponding field until the target has been reached. This makes it possible to communicate via several devices.

The protocol expansion field 2101 is placed in front of the utility telegram 2102 as a kind of header. The expansion header 2101 is interpreted by the wireless receiver R, and the utility telegram 2102 is passed on based on the stored parameters.

This protocol expansion takes place via the connection between a parameterization device and the wireless receiver R, and makes it possible to distinguish between two cases. In the first case, the protocol 2107 can initially direct an instruction from the wireless receiver R to the wireless transmitter T. To this end, the message telegram 2107 has the expansion header 2101 and the utility signal 2102 with the parameter for the wireless receiver 2104. The message format 2107 is used during a transmission as shown on FIG. 2. If the wireless receiver R receives the data telegram 2107, the address information is evaluated from the parameter 2111 in the wireless receiver R. The address of the wireless transmitter T to be addressed is retrieved from the address field G_ADR 2114. A new data telegram is generated, and the parameter for the wireless transmitter T is transmitted from the wireless receiver R via the radio connection 200. The wireless transmitter T that matches the address in the address field G_ADR is responsible for responding to the telegram.

The telegram 2106 is transmitted via a measured value transmission arrangement, as shown on FIG. 3. Once the data collector S receives the message telegram 2106, the data collector S evaluates the address information from the parameter 2111. The address of the wireless receiver R to be addressed is stored in the address information field G_ADR 2114. The address information from address field G_ADR is retrieved, and a new message telegram is generated in the data collector S. This data diagram is transmitted to the connected wireless receiver R. The header information 2101 intended for the data collector is here removed, and the utility data 2103 and 2102 are relayed on to the wireless receiver R. The wireless receiver R generates a new transmission telegram, and transmits this new transmission telegram to the wireless transmitter T via the radio interface 200. The wireless transmitter T recognizes that the utility telegram 2102 contains an inquiry for the connected HART® sensor, and the wireless transmitter T relays the utility telegram 2102, and in particular the parameter for the sensor 2105, to the sensor 100.

By way of addition, it must be noted that "encompassing" or "comprising" does not preclude any other elements or steps, and that "one" or "a" does not preclude a plurality. Further, let it be noted that features or steps described with reference to one of the above exemplary embodiments can also be used in combination with other features or steps from other exemplary embodiments described above. References in the claims are not be regarded as limiting.

What is claimed is:

1. A transceiver for a wireless transmission of a field device signal, comprising:
   a radio interface for wireless communication; and
   a field device interface exchanging the field device signal provided by a measuring device;
   wherein the radio interface and the field device interface is provided in such a way that the field device signal is switchable between the radio interface and the field device interface;
   wherein the field device interface is adapted in such a way that a field device-specific function that controls the field device is provided in a first operating state and an evaluator-specific function for preparing a measured value is provided in a second operating state;
   wherein the transceiver is further adapted for presetting the operating state for the transceiver;
   wherein the field device interface is adapted for being coupled to the field device during execution of the field device specific function in the first operating state and to an evaluator during execution of the evaluator-specific function in the second operating state; and
   wherein the transceiver is adapted for wirelessly receiving a radio signal comprising the field device signal and for making the field device signal available to the evaluator.

2. The transceiver according to claim 1, wherein the field device signal is selected from a group comprising of a HART® signal, a Profibus signal, a Fieldbus Foundation signal, a 4 . . . 20 mA signal, an I.sup.2C signal and a switch signal.

3. The transceiver according to claim 2, wherein the field device interface is adapted as an internal interface.

4. The transceiver according to claim 1, wherein the radio interface exhibits an antenna with pre-settable antenna characteristics.

5. The transceiver according to claim 1, wherein the radio interface includes a power limiter.

6. The transceiver according to claim 1, wherein the radio interface operates at a pre-settable frequency of 900 MHz or 2.4 GHz.

7. The transceiver according to claim 1, wherein the transceiver is parameterized with a detachable display/control unit.

8. The transceiver according to claim 1, wherein the transceiver is switched between a master function and a slave function.

9. The transceiver according to claim 1, further comprising:
   an offset interface device including a plurality of field device interfaces,
   wherein the offset interface device is coupled to the transceiver via one of the plurality of field device interfaces, and wherein at least one of the plurality of field device interfaces provides a field device signal of a remote field device.

10. The transceiver according to claim 1, further comprising:
    a modular casing including a top casing module and a receptacle casing module,
    wherein the receptacle casing module provides a field device interface and is coupled to the top casing module.

11. The transceiver according to claim 10, wherein the field device interface provided by the receptacle casing module is adapted as a terminal for a two-conductor field device.

12. The transceiver according to claim 10, wherein the field device interface provided by the receptacle casing module is adapted as a terminal for a four-conductor field device.

13. The transceiver according to claim 10, wherein the field device interface provided by the receptacle casing module is adapted as a terminal for a switch.

14. The transceiver according to claim 10, wherein the field device interface provided by the receptacle casing module is adapted as a terminal for a 4 . . . 20 mA device.

15. The transceiver according to claim 10, wherein the receptacle casing module determines the operating mode of the transceiver.

16. The transceiver according to claim 10, wherein the receptacle casing module determines a type of transceiver depending on the provided interface.

17. The transceiver according to claim 10, wherein the top casing module includes an antenna.

18. The transceiver according to claim 17, wherein the antenna is screwed to the top casing module.

19. The transceiver according to claim 18, wherein the antenna is screwed to the top casing module using an M20× 1.5 threaded joint or a ½" NPT threaded joint.

20. The transceiver according to claim 1, wherein the field device interface is connecting a conduit.

21. The transceiver according to claim 1, further comprising:
    a power supply supplying energy to a field device.

22. A wireless measured value transmission arrangement, comprising:
    a first transceiver according to claim 1; and
    a second transceiver according to claim 1; wherein the first transceiver is in a first operating state and the second transceiver is in a second operating state, and
    wherein the arrangement provides a field device signal received at a field device interface of the first transceiver to a field device interface of the second transceiver.

23. The arrangement according of claim 22, further comprising:
    a third transceiver according to claim 1; and
    an offset interface device including a plurality of field device interfaces,
    wherein the third transceiver is in the first operating state;
    wherein the offset interface device is coupled to the second transceiver via a first field device interface;
    wherein a second field device interface of the offset interface device provides a measured value received at the field device interface of the first transceiver; and
    wherein a third field device interface of the offset interface device provides a measured value received at the field device interface of the third transceiver.

24. The transceiver according to claim 1, further comprising a detection device adapted for detecting a desired operating state based on one of a field device connected to the transceiver and an evaluator connected to the transceiver.

25. The transceiver according to claim 1, further comprising a receptacle casing module, wherein the receptacle casing module is designed to determine and set the operating state of the transceiver.

* * * * *